United States Patent
Yang et al.

(10) Patent No.: US 9,967,868 B2
(45) Date of Patent: *May 8, 2018

(54) METHOD AND DEVICE FOR TRANSMITTING CONTROL INFORMATION

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/465,197

(22) Filed: Mar. 21, 2017

(65) Prior Publication Data

US 2017/0196004 A1 Jul. 6, 2017

Related U.S. Application Data

(63) Continuation of application No. 14/808,407, filed on Jul. 24, 2015, now Pat. No. 9,642,160, which is a
(Continued)

(51) Int. Cl.
| | |
|---|---|
| *H04L 12/28* | (2006.01) |
| *H04W 72/04* | (2009.01) |
| *H04L 5/00* | (2006.01) |
| *H04L 1/18* | (2006.01) |

(Continued)

(52) U.S. Cl.
CPC ....... *H04W 72/0413* (2013.01); *H04L 1/1864* (2013.01); *H04L 5/001* (2013.01); *H04L 5/0055* (2013.01); *H04W 74/006* (2013.01)

(58) Field of Classification Search
CPC .......................... H04W 74/004; H04L 1/1861
(Continued)

(56) References Cited

U.S. PATENT DOCUMENTS

| | | | |
|---|---|---|---|
| 2009/0245198 | A1 | 10/2009 | Tiirola et al. |
| 2009/0303978 | A1 | 12/2009 | Pajukoski et al. |

(Continued)

FOREIGN PATENT DOCUMENTS

| | | |
|---|---|---|
| CN | 101064638 | 10/2007 |
| CN | 101651986 | 2/2010 |

(Continued)

OTHER PUBLICATIONS

Deutsches Patent- und Markenamt Application No. 112011103064.9, Office Action dated Dec. 19, 2014, 12 pages.
(Continued)

*Primary Examiner* — John Pezzlo
(74) *Attorney, Agent, or Firm* — Lee Hong Degerman Kang Waimey

(57) ABSTRACT

A method for transmitting uplink control information and to an apparatus therefor. The method includes: selecting one uplink control channel resource corresponding to a plurality of HARQ-ACKs from among a plurality of uplink control channel resources; and transmitting a bit value corresponding to the plurality of HARQ-ACKs using the selected uplink control channel resource.

6 Claims, 15 Drawing Sheets

Related U.S. Application Data continuation of application No. 13/821,967, filed as application No. PCT/KR2011/006771 on Sep. 14, 2011, now Pat. No. 9,161,349.

(60) Provisional application No. 61/382,455, filed on Sep. 13, 2010, provisional application No. 61/389,694, filed on Oct. 4, 2010, provisional application No. 61/393,366, filed on Oct. 15, 2010, provisional application No. 61/409,957, filed on Nov. 3, 2010, provisional application No. 61/422,653, filed on Dec. 13, 2010.

(51) Int. Cl.
*H04W 74/00* (2009.01)
*H04J 1/16* (2006.01)

(58) Field of Classification Search
USPC .............................. 370/252, 278, 328, 430
See application file for complete search history.

(56) References Cited

U.S. PATENT DOCUMENTS

| | | |
|---|---|---|
| 2010/0210256 A1 | 8/2010 | Shen et al. |
| 2011/0045860 A1 | 2/2011 | Nam et al. |
| 2011/0090825 A1 | 4/2011 | Papasakellariou et al. |
| 2011/0105165 A1 | 5/2011 | Sagfors et al. |
| 2011/0243066 A1* | 10/2011 | Nayeb Nazar .......... H04L 1/007 370/328 |
| 2015/0334741 A1 | 11/2015 | Yang et al. |
| 2017/0230966 A1* | 8/2017 | Han ................. H04W 72/0413 |

FOREIGN PATENT DOCUMENTS

| | | |
|---|---|---|
| KR | 1020100071095 | 6/2010 |
| WO | 2010/018987 | 2/2010 |

OTHER PUBLICATIONS

The State Intellectual Property Office of the People's Republic of China Application Serial No. 201180044056.1, Office Action dated Jan. 29, 2015, 10 pages.

Texas Instruments, "Resource Allocation for A/N Transmission on PUCCH", R1-104466, 3GPP TSG RAN WG1 #62, Aug. 2010, 4 pages.

LG Electronics, "Further details of ACK/NACK selection method", R1-104641, 3GPP TSG RAN WG1 #62, Aug. 2010, 8 pages.

Samsung, "PUCCH HARQ-ACK Resource Mapping for DL CA", R1-103637, 3GPP TSG RAN WG1 #61bis, Jun. 2010, 3 pages.

PCT International Application No. PCT/KR2011/006771, Written Opinion of the International Searching Authority dated Mar. 2, 2012, 9 pages.

PCT International Application No. PCT/KR2011/006771, Written Opinion of the International Searching Authority dated Mar. 2, 2012, 16 pages.

Huawei, "Resource Allocation for uplink ACK/NACK multiplexing," 3GPP TSG RAN WG1 Meeting #62, R1-104282, Aug. 2010, 5 pages.

The State Intellectual Property Office of the People's Republic of China Application Serial No. 201180044056.1, Office Action dated Aug. 24, 2015, 6 pages.

* cited by examiner

METHOD AND DEVICE FOR TRANSMITTING CONTROL INFORMATION

CROSS-REFERENCE TO RELATED APPLICATIONS

This application is a continuation of U.S. patent application Ser. No. 14/808,407, filed on Jul. 24, 2015, now U.S. Pat. No. 9,642,160, which is a continuation of U.S. patent application Ser. No. 13/821,967, filed on Mar. 8, 2013, now U.S. Pat. No. 9,161,349, which is the National Stage filing under 35 U.S.C. 371 of International Application No. PCT/KR2011/006771, filed on Sep. 14, 2011, which claims the benefit of U.S. Provisional Application Nos. 61/382,455, filed on Sep. 13, 2010, 61/389,694, filed on Oct. 4, 2010, 61/393,366, filed on Oct. 15, 2010, 61/409,957, filed on Nov. 3, 2010, and 61/422,653, filed on Dec. 13, 2010, the contents of which are all hereby incorporated by reference herein in their entirety.

TECHNICAL FIELD

The present invention relates to a wireless communication system, and more particularly, to a method and apparatus for transmitting control information.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method of efficiently transmitting uplink control information and an apparatus therefor in a wireless communication system. Another object of the present invention is to provide a method of efficiently transmitting control information, preferably, ACK/NACK information in a multicarrier situation and an apparatus therefor.

It will be appreciated by persons skilled in the art that the objects that could be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink control information when a plurality of cells including a primary cell and a secondary cell are configured in a wireless communication system, the method including: selecting one PUCCH (Physical Uplink Control Channel) resource pair corresponding to a plurality of HARQ-ACKs from among a plurality of PUCCH resource pairs for PUCCH format 1b; and transmitting a bit value corresponding to the plurality of HARQ-ACKs using the selected PUCCH resource pair through multiple antennas, wherein the plurality of PUCCH resource pairs includes resources shown in the following table,

|       | PUCCH resource pair #1 | PUCCH resource pair #2 |
|-------|------------------------|------------------------|
| TX #N | $IMP_P$                | $EXP_1$                |
| TX #M | $IMP_{P+1}$            | $EXP_2$                | wherein TX #N and TX #M respectively denote antenna ports N and M, $IMP_P$ denotes a PUCCH resource linked to a lowest CCE (Control Channel Element) index $n_{CCE,P}$ corresponding to a PDCCH (Physical Downlink Control Channel) relating to a PDSCH (Physical Downlink Shared Channel) in the primary cell, $IMP_{P+1}$ represents a PUCCH resource linked to $n_{CCE,P}+1$, and $EXP_1$ and $EXP_2$ represent PUCCH resources configured by a higher layer.

In another aspect of the present invention, provided herein is a communication apparatus configured to transmit uplink control information when a plurality of cells including a primary cell and a secondary cell are configured in a wireless communication system, the communication apparatus including an RF unit, and a processor, wherein the processor is configured to select one PUCCH resource pair corresponding to a plurality of HARQ-ACKs from among a plurality of PUCCH resource pairs for PUCCH format 1b and to transmit a bit value corresponding to the plurality of HARQ-ACKs using the selected PUCCH resource pair through multiple antennas, wherein the plurality of PUCCH resource pairs includes resources shown in the following table,

|       | PUCCH resource pair #1 | PUCCH resource pair #2 |
|-------|------------------------|------------------------|
| TX #N | $IMP_P$                | $EXP_1$                |
| TX #M | $IMP_{P+1}$            | $EXP_2$                | wherein TX #N and TX #M respectively denote antenna ports N and M, $IMP_P$ denotes a PUCCH resource linked to a lowest CCE index $n_{CCE,P}$ corresponding to a PDCCH relating to a PDSCH in the primary cell, $IMP_{P+1}$ represents a PUCCH resource linked to $n_{CCE,P}+1$, and $EXP_1$ and $EXP_2$ represent PUCCH resources configured by a higher layer.

The plurality of PUCCH resource pairs may include resources shown in the following table,

|       | PUCCH resource pair #1 | PUCCH resource pair #2 | PUCCH resource pair #3 | PUCCH resource pair #4 |
|-------|------------------------|------------------------|------------------------|------------------------|
| TX #N | $IMP_P$                | $EXP_1$                | $EXP_3$                | $EXP_5$                |
| TX #M | $IMP_{P+1}$            | $EXP_2$                | $EXP_4$                | $EXP_6$                | wherein $EXP_3$ to $EXP_6$ represent PUCCH resources allocated using a resource indication value included in a PDCCH corresponding to a PDSCH in the secondary cell.

The plurality of PUCCH resource pairs may include resources shown in the following table,

|  | PUCCH resource pair #1 | PUCCH resource pair #2 | PUCCH resource pair #3 | PUCCH resource pair #4 |
|---|---|---|---|---|
| TX #N | $IMP_P$ | $EXP_1$ | $IMP_S$ | $EXP_3$ |
| TX #M | $IMP_{P+1}$ | $EXP_2$ | $IMP_{S+1}$ | $EXP_4$ | wherein $IMP_S$ denotes a PUCCH resource linked to a lowest CCE index $n_{CCE,S}$ corresponding to a PDCCH relating to a PDSCH in the secondary cell, $IMP_{S+1}$ represents a PUCCH resource linked to $n_{CCE,S}+1$, and $EXP_3$ and $EXP_4$ represent PUCCH resources allocated using a resource indication value included in the PDCCH corresponding to the PDSCH in the secondary cell.

The resource indication value may be an offset corresponding to a multiple of 2, and $EXP_3$ to $EXP_6$ may be given as follows:
- $EXP_3$: a first reference PUCCH index configured by the higher layer+the offset,
- $EXP_4$: the first reference PUCCH index configured by the higher layer+the offset+1,
- $EXP_5$: a second reference PUCCH index configured by the higher layer+the offset, and
- $EXP_6$: the second reference PUCCH index configured by the higher layer+the offset+1.

The resource indication value may be an offset corresponding to a multiple of 1, and $EXP_3$ to $EXP_6$ may be given as follows:
- $EXP_3$: a first reference PUCCH index configured by the higher layer+the offset,
- $EXP_4$: the first reference PUCCH index configured by the higher layer+the offset+1,
- $EXP_5$: a second reference PUCCH index configured by the higher layer+the offset, and
- $EXP_6$: the second reference PUCCH index configured by the higher layer+the offset+1.

The resource indication value may be an offset corresponding to a multiple of 1, and $EXP_3$ to $EXP_6$ may be given as follows:
- $EXP_3$: a first reference PUCCH index configured by the higher layer,
- $EXP_4$: the first reference PUCCH index configured by the higher layer+the offset,
- $EXP_5$: a second reference PUCCH index configured by the higher layer+the offset, and
- $EXP_6$: the second reference PUCCH index configured by the higher layer+the offset.

The primary cell includes a PCC (Primary Component Carrier) and the secondary cell includes a SCC (Secondary Component Carrier).

Advantageous Effects

According to the present invention, uplink control information can be efficiently transmitted in a wireless communication system. Furthermore, control information, preferably, ACK/NACK information can be efficiently transmitted in a multicarrier situation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

Figure 1:
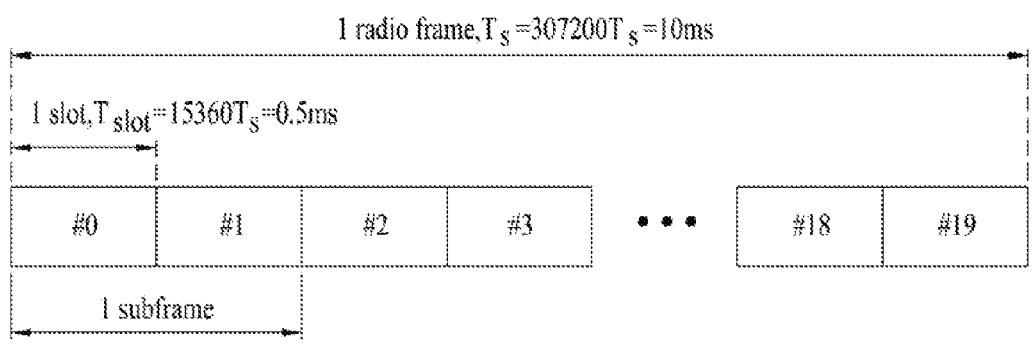
FIG. 1 illustrates a radio frame structure.

FIG. 1 illustrates a radio frame structure.

Referring to FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) or single carrier frequency division multiple access (SC-FDMA) symbols in time domain. Since LTE uses the OFDMA in the downlink and uses SC-FDMA in the uplink, an OFDM or SC-FDMA symbol represents one symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
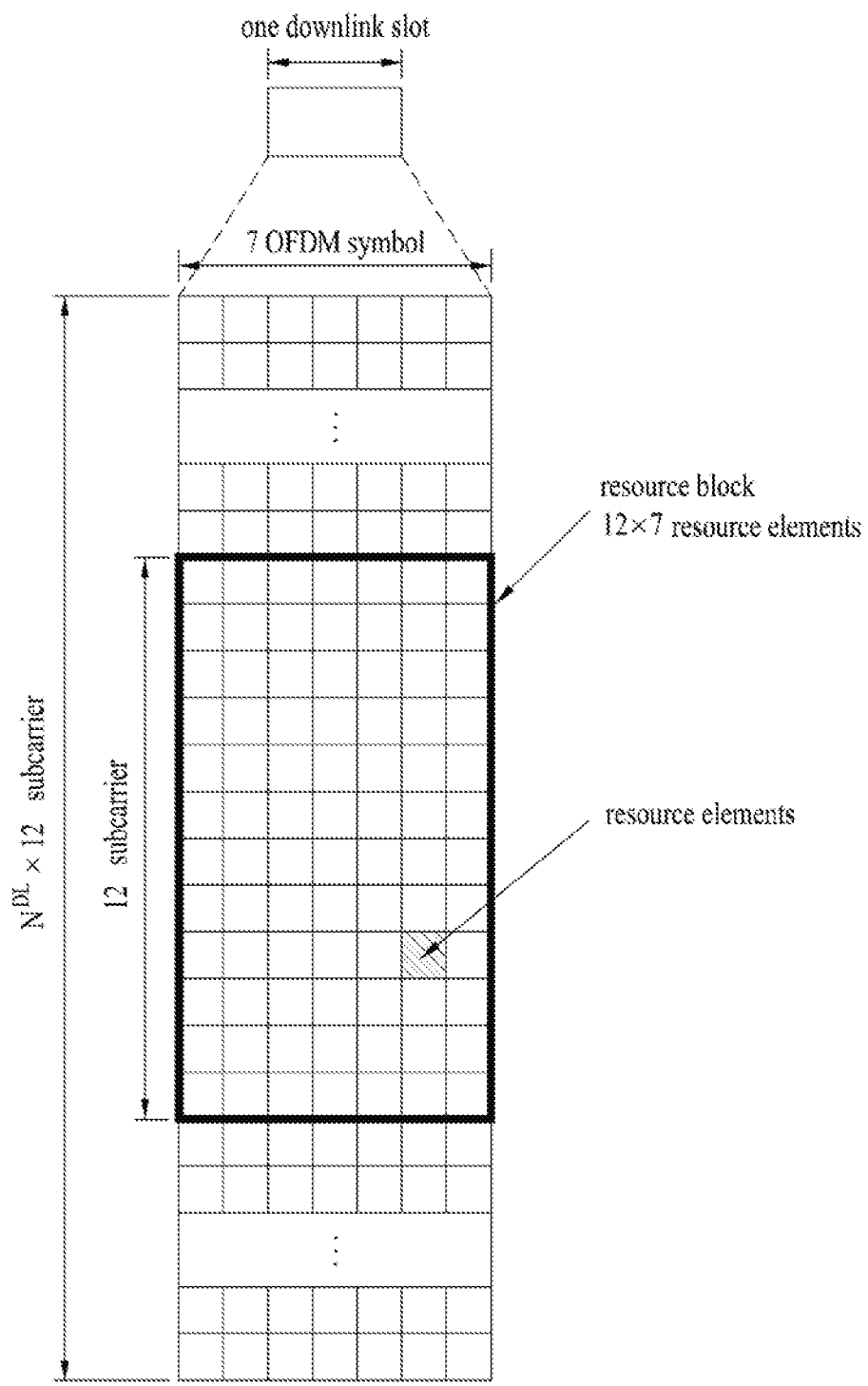
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
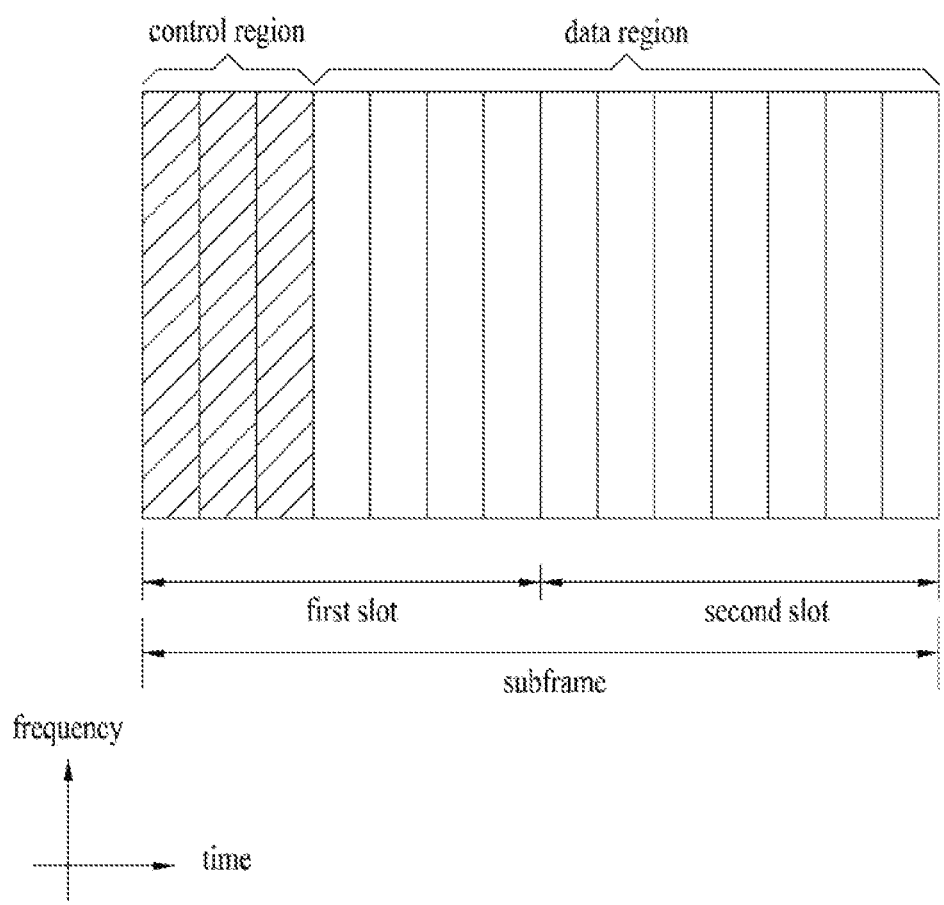
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO
  Transmission mode 6: Closed-loop rank-1 precoding
  Transmission mode 7: Transmission using UE-specific reference signals DCI Format
  Format 0: Resource grants for the PUSCH transmissions (uplink)
  Format 1: Resource assignments for single codeword PDSCH transmissions (transmission modes 1, 2 and 7)
  Format 1A: Compact signaling of resource assignments for single codeword PDSCH (all modes)
  Format 1B: Compact resource assignments for PDSCH using rank-1 closed loop precoding (mod 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoI P), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
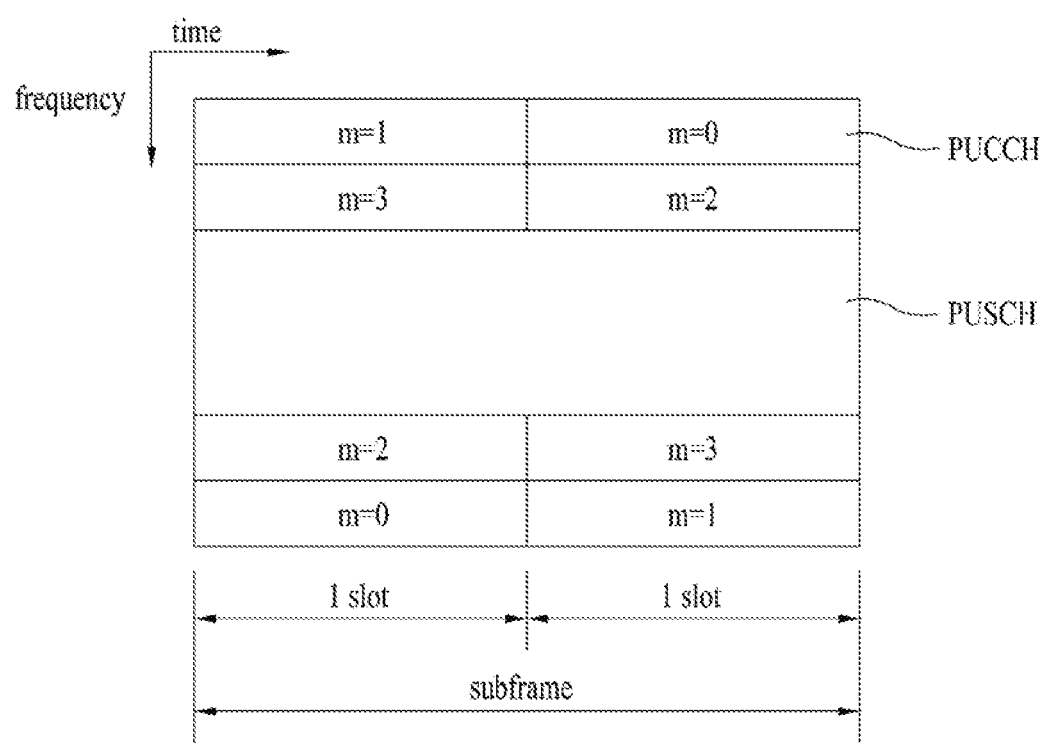
FIG. 4 illustrates an uplink subframe structure.

FIG. 4 illustrates an uplink subframe structure. Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE.

TABLE 1

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
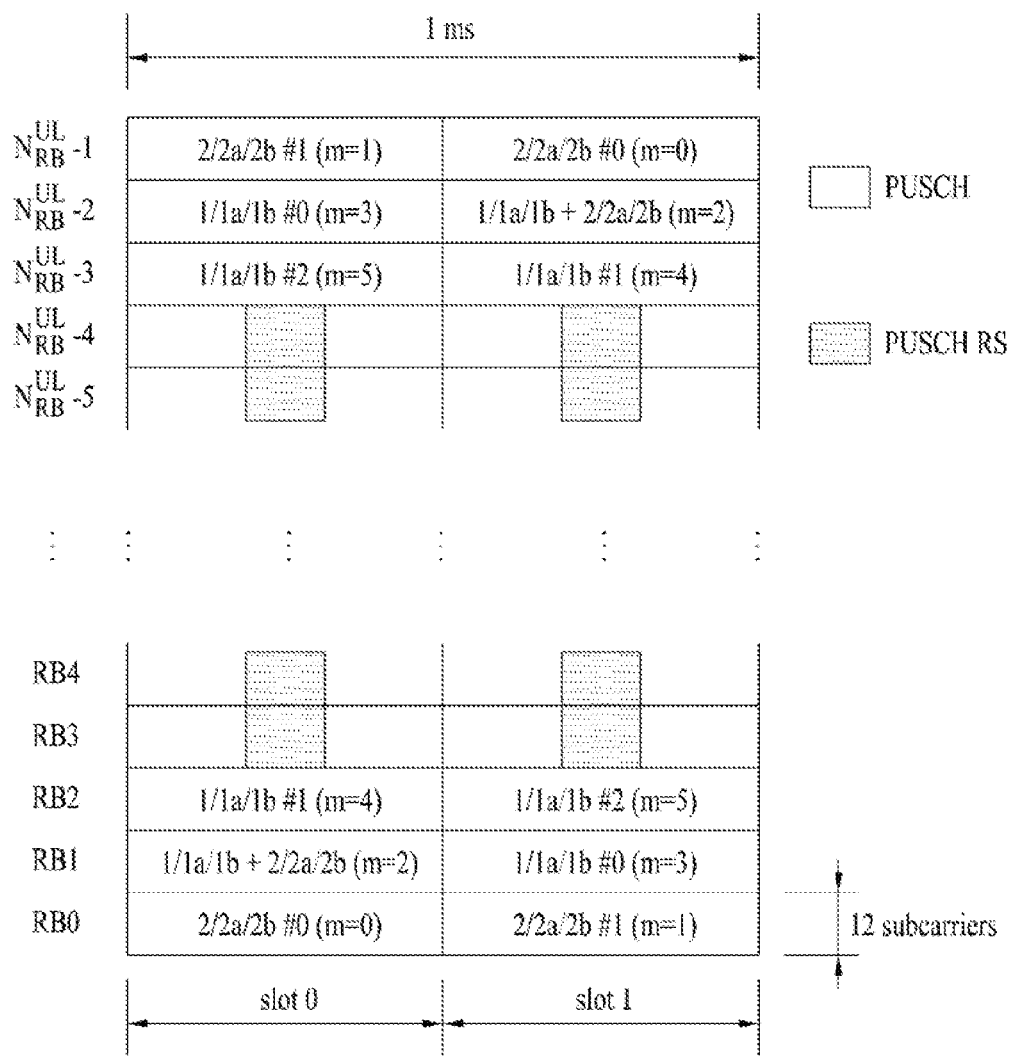
FIG. 5 illustrates an example of physically mapping a PUCCH format to a PUCCH region.

FIG. 5 illustrates an example of physically mapping a PUCCH format to a PUCCH region.

Referring to FIG. 5, PUCCH formats are mapped onto RBs in the order of PUCCH formats 2/2a/2b (CQI) (e.g. PUCCH regions m=0, 1), PUCCH formats 2/2a/2b (CQI) or PUCCH formats 1/1a/1b (SR/HARQ ACK/NACK) (e.g. PUCCH region m=2 if present), and PUCCH formats 1/1a/1b (SR/HARQ ACK/NACK) (e.g. PUCCH regions m=3, 4, 5), starting from the band-edge, and transmitted. The number of PUCCH RBs, $N_{RB}^{(2)}$, which can be used for PUCCH formats 2/2a/2b (CQI) is signaled to a UE in a cell through broadcast signaling.

The periodicity and frequency resolution to be used by a UE to report CQI are both controlled by the BS. In the time domain, both periodic and aperiodic CQI reporting are supported. The PUCCH format 2 is used for periodic CQI reporting. In periodic CQI reporting, CQI is piggybacked on data and then transmitted through a PUSCH if the PUSCH is scheduled for a subframe reserved for CQI transmission. A PUSCH is used for aperiodic CQI reporting, whereby the BS specifically instructs the UE to send an individual CQI report embedded into a resource which is scheduled for uplink data transmission.

Figure 6:
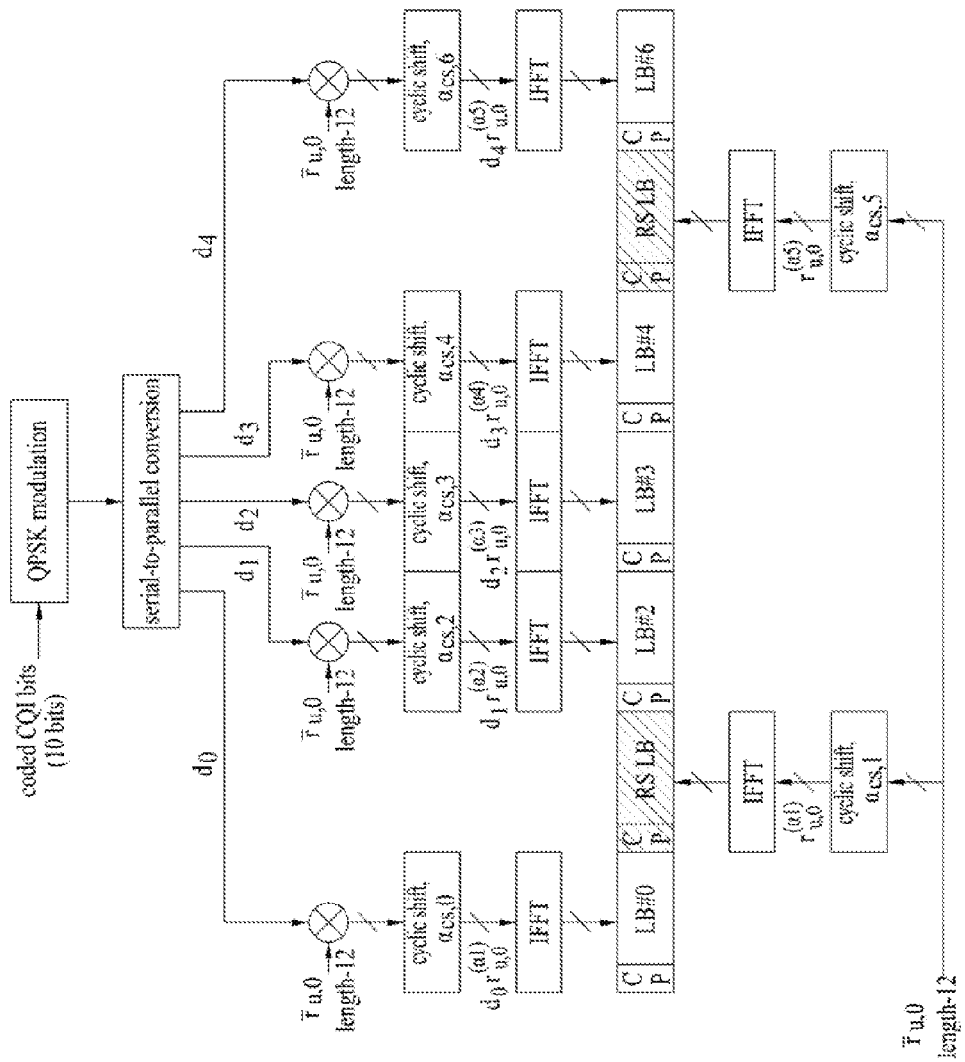
FIG. 6 illustrates a slot level structure of PUCCH format 2/2a/2b.

FIG. 6 illustrates a slot level structure of PUCCH formats 2/2a/2b. The PUCCH formats 2/2a/2b are used for CQI transmission. In the case of normal CP, SC-FDMA symbols #1 and #5 in a slot are used for transmission of a Demodulation Reference Signal (DM RS). In the case of extended CP, only SC-FDMA #3 in the slot is used for DM RS transmission.

Referring to FIG. 6, at a subframe level, 10-bit CSI is channel-coded into 20 coded bits using (20, k) Reed-Muller code punctured at a rate of 1/2 (not shown). The coded bits are scrambled (not shown) and then mapped to Quadrature Phase Shift Keying (QPSK) constellation (QPSK modulation). Scrambling can be performed using length-31 gold sequence in a similar manner that PUSCH data is scrambled. 10 QPSK modulation symbols are generated according to the QPSK modulation, and 5 QPSK modulation symbols $d_0$, $d_1$, $d_2$, $d_3$ and $d_4$ are transmitted through SC-FDMA symbols corresponding thereto in each slot. Each of the QPSK modulation symbols is used to modulate a length-12 base RS sequence $r_{u,0}$ prior to being subjected to Inverse Fast Fourier Transform (IFFT). Consequently, the RS sequence is cyclic-shifted in the time domain according to the QPSK modulation symbol value ($d_x * r_{u,0}^{(\alpha x)}$, x=0 to 4). The RS sequence multiplied by the QPSK modulation symbol is cyclic-shifted ($\alpha_{cs,x}$, x=1, 5). When the number of cyclic shifts is N, N UEs can be multiplexed on the same CSI PUCCH RB. While a DM RS sequence is similar to a CSI sequence in the frequency domain, the DM RS sequence is not modulated by a CQI modulation symbol.

Parameters/resources for periodic CQI reports are configured semi-statically according to higher layer (e.g. Radio Resource Control (RRC)) signaling. If PUCCH resource index $n_{PUCCH}^{(2)}$ is set for CQI transmission, for example, CQI is periodically transmitted on a CQI PUCCH linked to PUCCH resource index $n_{PUCCH}^{(2)}$. PUCCH resource index $n_{PUCCH}^{(2)}$ indicates a PUCCH RB and cyclic shift $\alpha_{cs}$.

Figure 7:
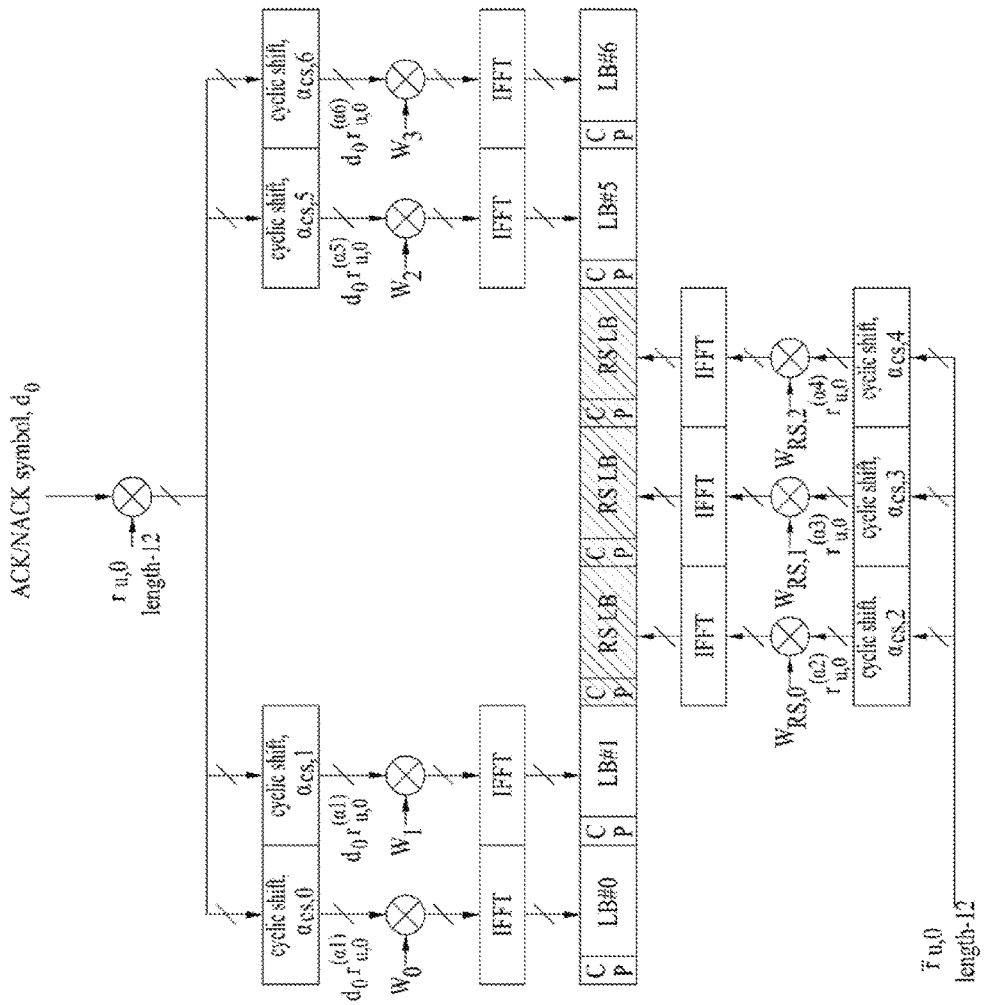
FIG. 7 illustrates a slot level structure of PUCCH format 1a/1b.

FIG. 7 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 7, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 2 shows a modulation table defined for PUCCH formats 1a and 1b in LTE.

TABLE 2

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 8:
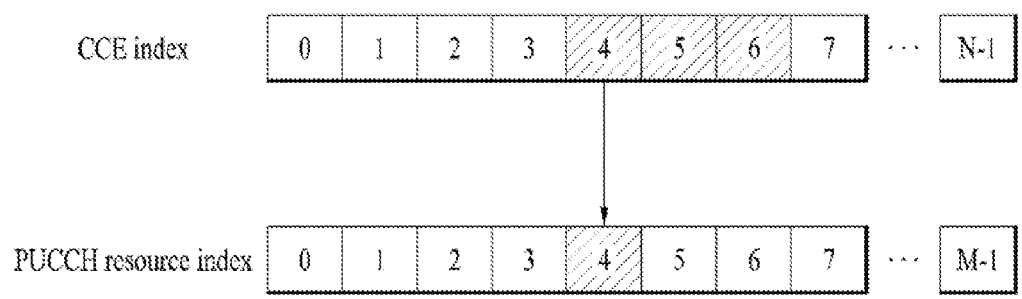
FIG. 8 illustrates an example of determining a PUCCH resource for ACK/NACK.

FIG. 8 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 8, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 8, a UE transmits an ACK/NACK signal on PUCCH #4 corresponding to CCE #4, the first CCE of the PDCCH. FIG. 8 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

When an LTE system operates in TDD, a UE transmits one multiplexed ACK/NACK signal for a plurality of PDSCHs received through subframes at different timings. Specifically, the UE transmits one multiplexed ACK/NACK signal for a plurality of PDSCHs using an ACK/NACK channel selection scheme (PUCCH selection scheme). The ACK/NACK channel selection scheme is also referred to as a PUCCH selection scheme. When the UE receives a plurality of DL data in the ACK/NACK channel selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 3 shows an ACK/NACK channel selection scheme defined in LTE.

TABLE 3

| HARQ-ACK(0), HARQ-ACK(1), HARQ-ACK(2), HARQ-ACK(3) | Subframe $n^{(1)}_{PUCCH,X}$ | b(0), b(1) |
|---|---|---|
| ACK, ACK, ACK, ACK | $n^{(1)}_{PUCCH, 1}$ | 1, 1 |
| ACK, ACK, ACK, NACK/DTX | $n^{(1)}_{PUCCH, 1}$ | 1, 0 |
| NACK/DTX, NACK/DTX, NACK, DTX | $n^{(1)}_{PUCCH, 2}$ | 1, 1 |
| ACK, ACK, NACK/DTX, ACK | $n^{(1)}_{PUCCH, 1}$ | 1, 0 |
| NACK, DTX, DTX, DTX | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 0, 1 |
| NACK/DTX, NACK/DTX, NACK/DTX, NACK | $n^{(1)}_{PUCCH, 3}$ | 1, 1 |
| ACK, NACK/DTX, ACK, NACK/DTX | $n^{(1)}_{PUCCH, 2}$ | 0, 1 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |
| NACK/DTX, ACK, ACK, ACK | $n^{(1)}_{PUCCH, 3}$ | 0, 1 |
| NACK/DTX, NACK, DTX, DTX | $n^{(1)}_{PUCCH, 1}$ | 0, 0 |
| NACK/DTX, ACK, ACK, NACK/DTX | $n^{(1)}_{PUCCH, 2}$ | 1, 0 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| DTX, DTX, DTX, DTX | N/A | N/A |

In Table 3, HARQ-ACK(i) indicates the HARQ ACK/NACK/DTX result of an i-th data unit (0≤i≤3). DTX (Discontinuous Transmission) represents that there is no transmission of a data unit corresponding to HARQ-ACK(i) or the UE does not detect the data unit corresponding to HARQ-ACK(i). Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 3, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 9:
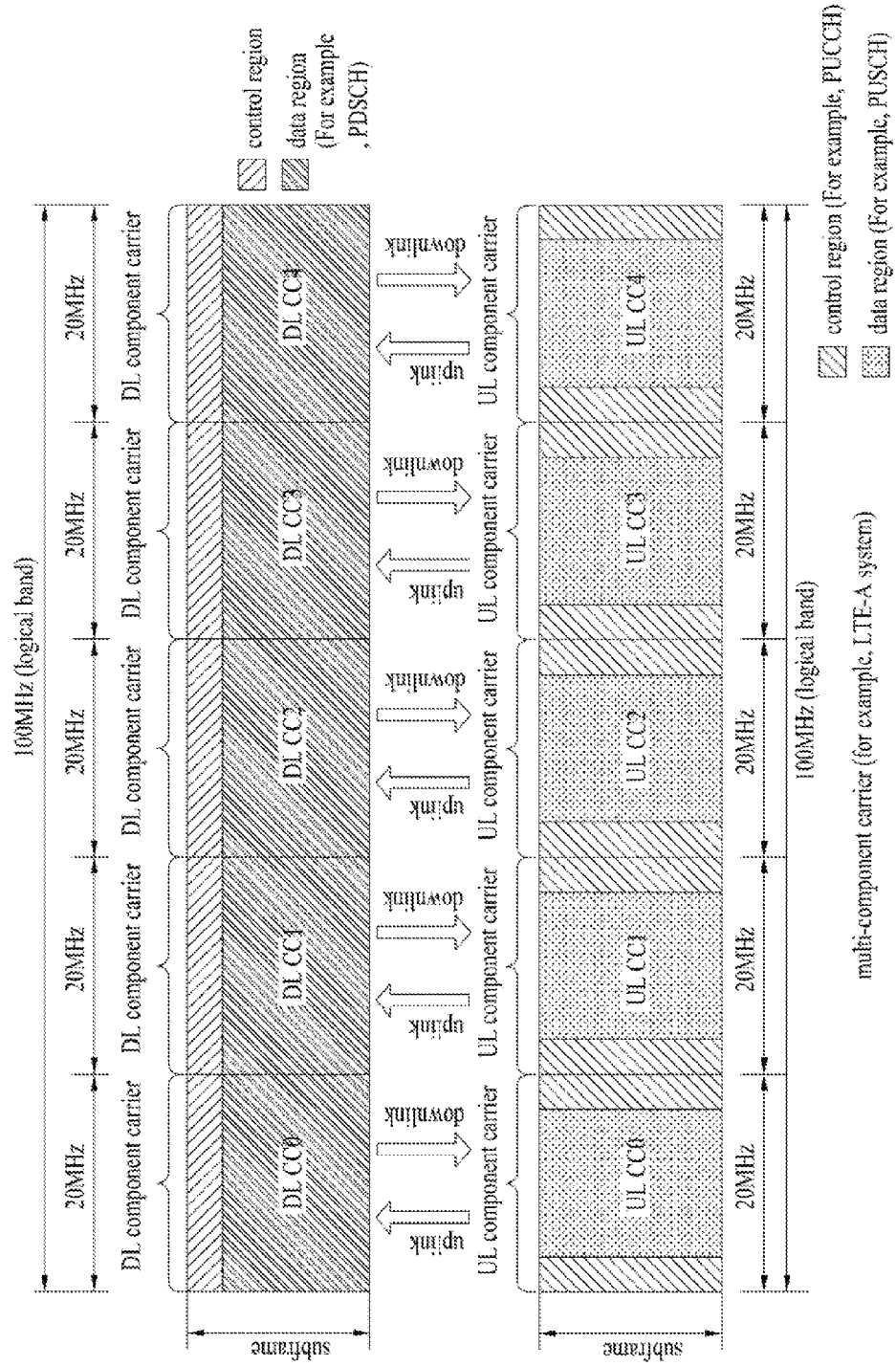
FIG. 9 illustrates a carrier aggregation (CA) communication system.

FIG. 9 illustrates a Carrier Aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a Component Carrier (CC). The CC can be regarded as a carrier frequency (or center carrier, center frequency) for the frequency block.

Referring to FIG. 9, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1.

A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not configured or which does not support CA. On the other hand, one or more serving cells exist, including a PCell and entire SCells, for a UE in an RRC_CONNECTED state, for which CA is configured. For CA, a network may configure one or more SCells in addition to an initially configured PCell, for a UE supporting CA during connection setup after an initial security activation operation is initiated.

Figure 10:
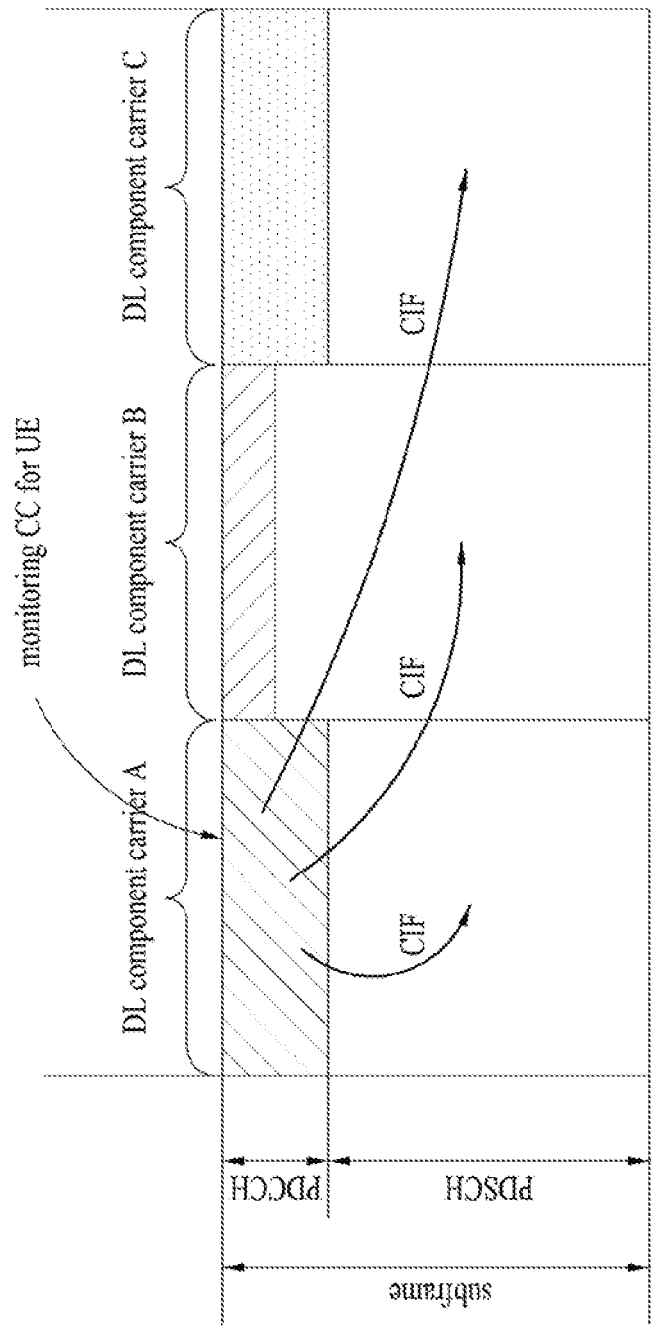
FIG. 10 illustrates scheduling in case of aggregation of a plurality of carriers.

FIG. 10 illustrates scheduling when a plurality of carriers is aggregated. It is assumed that 3 DL CCs are aggregated and DL CC A is configured as a PDCCH CC. DL CC A, DL CC B and DL CC C can be called serving CCs, serving carriers, serving cells, etc. If CIF is disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not configured as PDCCH CCs do not deliver PDCCHs. Accordingly, the DL CC A (PDCCH CC) needs to include all of a PDCCH search space relating to the DL CC A, a PDCCH search space relating to the DL CC B and a PDCCH search space relating to the DL CC C.

LTE-A considers transmission of a plurality of ACK/NACK information/signals with respect to a plurality of PDSCHs, which are transmitted through a plurality of DL CCs, through a specific UL CC (e.g. UL PCC or UL PCell). For description, it is assumed that a UE operates in a SU-MIMO (Single User-Multiple Input Multiple Output) mode in a certain DL CC to receive 2 codewords (or transport blocks). In this case, the UE needs to be able to transmit 4 feedback states, ACK/ACK, ACK/NACK, NACK/ACK and NACK/NACK, or up to 5 feedback states including even DTX for the DL CC. If the DL CC is configured to support a single codeword (or transport block), up to 3 states of ACK, NACK and DTX are present for the DL CC. Accordingly, if NACK and DTX are processed as the same state, a total of 2 feedback states of ACK and NACK/DTX are present for the DL CC. Accordingly, if the UE aggregates a maximum of 5 DL CCs and operates in the SU-MIMO mode in all CCs, the UE can have up to 55 transmittable feedback states and an ACK/NACK payload size for representing the feedback states corresponds to 12 bits. If DTX and NACK are processed as the same state, the number of feedback states is 45 and an ACK/NACK payload size for representing the same is 10 bits.

To achieve this, LTE-A considers a scheme of channel coding (e.g. Reed-Muller coding, Tail-biting convolutional coding, etc.) a plurality of ACKs/NACKs and transmitting a plurality of ACK/NACK information/signals using PUCCH format 2, or a new PUCCH format (e.g. block-spread based PUCCH format). Furthermore, LTE-A discusses transmission of a plurality of ACK/NACK information/signals using PUCCH format 1a/1b and ACK/NACK multiplexing (i.e. ACK/NACK selection) in a multi-carrier situation.

In an LTE TDD system, ACK/NACK multiplexing (i.e. ACK/NACK channel selection) is used to transmit a plurality of ACK/NACK responses with respect to a plurality of PDSCHs transmitted through a plurality of DL subframes, through one UL subframe. In LTE, a UE uses an implicit PUCCH resource corresponding to each PDCCH that schedules each PDSCH in order to reserve a plurality of PUCCH resources for ACK/NACK multiplexing (hereinafter, implicit ACK/NACK selection scheme). Specifically, a PUCCH resource is linked to a lowest CCE index $n_{CCE}$ (refer to Equation 1) corresponding to a PDCCH related to the PUCCH resource.

LTE-A considers transmission of a plurality of ACK/NACK information/signals for a plurality of PDSCHs transmitted through a plurality of DL CCs, through a specific UL CC. To achieve this, in the case of a MIMO transmission mode CC (simply, MIMO CC) that can carry up to 2 codewords (CWs), 2 implicit PUCCHs #1 and #2 respectively linked to a lowest CCE index $n_{CCE}$ of a PDCCH that schedules the corresponding CC and the following index $n_{CCE}+1$, or implicit PUCCH #1 and an explicit PUCCH previously allocated through RRC may be used. In the case of a non-MIMO transmission mode CC (simply, non-MIMO CC) that can carry a maximum of 1 codeword, an ACK/NACK selection scheme of using only implicit PUCCH #1 linked to a lowest CCE index $n_{CCE}$ of a PDCCH that schedules the corresponding CC may be considered. In other words, when ACK/NACK transmission is performed through a single antenna (port), the total number of PUCCH resources for ACK/NACK selection is configured as a maximum number of CWs that can be transmitted through all CCs allocated to a UE. This condition is called "condition #1" for convenience.

Table 4 shows an example of ACK/NACK (A/N) state-to-symbol(S) mapping for ACK/NACK selection under condition #1 when 2 CCs (e.g. 1 MIMO CC+1 non-MIMO CC) are allocated. In Table 5, the A/N state indicates a plurality of HARQ-ACK responses (e.g. HARQ-ACK(1), HARQ-ACK(2) and HARQ-ACK(3)). HARQ-ACK(1) and HARQ-ACK(2) correspond to HARQ-ACKs for the MIMO CC and HARQ-ACK(3) corresponds to HARQ-ACK for the non-MIMO CC. In Table 4, S denotes a modulation symbol (e.g. BPSK or QPSK symbol) mapped/transmitted to/on a PUCCH resource. The number of symbols mapped to the same PUCCH resource may be varied according to the total number of ACK/NACK states. In Table 4, S0 to S3 represent QPSK modulation symbols (e.g. {+1, −1, +j, −j}).

MIMO CC PUCCHs #1/#2 denote PUCCH resources (indexes) linked to the MIMO CC. For example, MIMO CC PUCCHs #1/#2 include PUCCH resources (indexes) linked to a PDCCH corresponding to a PDSCH on the MIMO CC. Non-MIMO CC PUCCH #1 indicates a PUCCH resource (index) linked to the non-MIMO CC. For example, non-MIMO CC PUCCH #1 includes a PUCCH resource (index) linked to a PDCCH corresponding to a PDSCH on the non-MIMO CC.

TABLE 4

| A/N state | MIMO CC PUCCH #1 | MIMO CC PUCCH #2 | non-MIMO CC PUCCH #1 |
|---|---|---|---|
| State #0 | S0 | 0 | 0 |
| State #1 | S1 | 0 | 0 |
| State #2 | S2 | 0 | 0 |
| State #3 | S3 | 0 | 0 |
| State #4 | 0 | S0 | 0 |
| State #5 | 0 | S1 | 0 |
| State #6 | 0 | S2 | 0 |
| State #7 | 0 | S3 | 0 |
| State #8 | 0 | 0 | S0 |
| State #9 | 0 | 0 | S1 |
| State #10 | 0 | 0 | S2 |
| State #11 | 0 | 0 | S3 |

In case of implicit ACK/NACK selection, an ACK/NACK state having DTX (i.e. a PDCCH that schedules a corresponding CC is not successfully received/detected) information for the corresponding CC cannot be mapped to an implicit PUCCH resource linked to the PDCCH that schedules the CC (i.e. linked to the CC). This is because DTX for a certain CC means that an implicit PUCCH resource linked to the CC is not available. That is, an implicit PUCCH resource linked to a CC and an A/N state mapped to the implicit PUCCH resource can be used/transmitted only when a PDCCH that schedules the CC is successfully received/detected. This is called "implicit mapping" for convenience.

LTE-A considers ACK/NACK transmission through transmit diversity (TxD). For example, SCBC (Space Code Block coding) can be considered as a TxD scheme for ACK/NACK selection. When it is assumed that 2 antennas (ports) are present, SCBC transmits a symbol S (modulation symbol to which an ACK/NACK state is mapped) through a first PUCCH resource in case of the first antenna (port) and transmits a modified symbol S* (or −S*) obtained by applying space coding (e.g. conjugate operation) to the symbol through a second PUCCH resource in case of the second antenna (port).

Equation 2 represents SCBC for ACK/NACK channel selection. It is assumed that 2 antennas (ports) and 2 PUCCH resources ch1 and ch2 are present for convenience.

$$\begin{array}{c} ch1 \quad ch2 \\ \text{Ant\#1} \begin{pmatrix} S_0 & S_1 \\ -S_1^* & S_0^* \end{pmatrix} \\ \text{Ant\#2} \end{array} \quad [\text{Equation 2}]$$

For antenna (port) #1, only one of the 2 PUCCH resources is selected according to ACK/NACK channel selection, and thus $[S_0=S, S_1=0], \{S_0=0, S_1=S\}$. Accordingly, the following 2 transmission schemes are available according to ACK/NACK channel selection results.

$$\begin{array}{c} ch1 \quad ch2 \\ \text{Ant\#1} \begin{pmatrix} S & 0 \\ 0 & S^* \end{pmatrix} \\ \text{Ant\#2} \end{array} \text{ or } \begin{array}{c} ch1 \quad ch2 \\ \text{Ant\#1} \begin{pmatrix} 0 & S \\ -S^* & 0 \end{pmatrix} \\ \text{Ant\#2} \end{array} \quad [\text{Equation 3}]$$

Table 5 shows an example of SCBC application when ACK/NACK selection is performed using 4 PUCCH resources. Here, ACK/NACK state mapping at the first antenna (i.e. antenna port #1) preferably corresponds to ACK/NACK state mapping during single antenna (i.e. non-TxD) ACK/NACK transmission. PUCCHs #0 to #3 indicate PUCCH resources, for example, PUCCH indexes (i.e. $n^{(1)}_{PUCCH,0}$ to $n^{(1)}_{PUCCH,3}$). PUCCHs #0/#1 and PUCCHs #2/#3 form resource pairs for SCBC.

TABLE 5

| A/N state | Antenna port #1 | | | | Antenna port #2 | | | |
|---|---|---|---|---|---|---|---|---|
| | PUCCH#0 | PUCCH#1 | PUCCH#2 | PUCCH#3 | PUCCH#0 | PUCCH#1 | PUCCH#2 | PUCCH#3 |
| State #0 | S0 | 0 | 0 | 0 | 0 | S0* | 0 | 0 |
| State #1 | S1 | 0 | 0 | 0 | 0 | S1* | 0 | 0 |
| State #2 | S2 | 0 | 0 | 0 | 0 | S2* | 0 | 0 |
| State #3 | S3 | 0 | 0 | 0 | 0 | S3* | 0 | 0 |
| State #4 | 0 | S0 | 0 | 0 | −S0* | 0 | 0 | 0 |
| State #5 | 0 | S1 | 0 | 0 | −S1* | 0 | 0 | 0 |
| State #6 | 0 | S2 | 0 | 0 | −S2* | 0 | 0 | 0 |
| State #7 | 0 | S3 | 0 | 0 | −S3* | 0 | 0 | 0 |
| State #8 | 0 | 0 | S0 | 0 | 0 | 0 | 0 | S0* |
| State #9 | 0 | 0 | S1 | 0 | 0 | 0 | 0 | S1* |
| State #10 | 0 | 0 | S2 | 0 | 0 | 0 | 0 | S2* |
| State #11 | 0 | 0 | S3 | 0 | 0 | 0 | 0 | S3* |
| State #12 | 0 | 0 | 0 | S0 | 0 | 0 | −S0* | 0 |
| State #13 | 0 | 0 | 0 | S1 | 0 | 0 | −S1* | 0 |
| State #14 | 0 | 0 | 0 | S2 | 0 | 0 | −S2* | 0 |
| state #15 | 0 | 0 | 0 | S3 | 0 | 0 | −S3* | 0 |

When ACK/NACK selection based ACK/NACK TxD transmission is applied in consideration of condition #1 and SCBC, the following needs to be taken into account for PUCCH resource allocation.

When PUCCH #0 and PUCCH #1 (or PUCCH #2 and PUCCH #3) that form an SCBC pair correspond to 2 PUCCH resources linked to one MIMO mode CC, there is no problem in TxD transmission. However, if PUCCH #0 and PUCCH #1 (or PUCCH #2 and PUCCH #3) correspond to PUCCH resources respectively linked to non-MIMO mode CC #1 and CC #2, TxD transmission resources corresponding to an SCBC pair may not be available. For example, if a PDCCH that schedules non-MIMO mode CC #2 is not successfully received/detected and only a PDCCH that schedules non-MIMO mode CC #1 is successfully received/detected, PUCCH #0 is available whereas PUCCH #1 is not available. Consequently, a problem that a resource corresponding to antenna port #2 for TxD transmission is not present is generated.

A description will be given of a scheme of efficiently transmitting uplink control information, preferably, ACK/NACK through multiple antennas when a plurality of CCs (in other words, carriers, frequency resources, cells, etc.) are aggregated, and a resource allocation scheme therefor.

It is assumed that 2 CCs are configured for one UE in the following description for convenience. Furthermore, it is assumed that a maximum of one transport block (or codeword) can be transmitted in a subframe k of a CC when the CC is configured as a non-MIMO mode and up to m (e.g. 2) transport blocks (or codewords) can be transmitted in the subframe k of the CC when the CC is configured as a MIMO mode. It is possible to recognize whether the CC is configured as the MIMO mode using a transmission mode configured by a higher layer. In addition, it is assumed that one (non-MIMO) or m (MIMO) ACKs/NACKs are generated for a corresponding CC according to a transmission mode configured for the corresponding CC irrespective of the number of actually transmitted transport blocks (or codewords).

Terms used in the specification will now be explained.

HARQ-ACK: this represents a reception response to a data block, that is, an ACK/NACK/DTX response (simply, ACK/NACK response). The ACK/NACK/DTX response means ACK, NACK, DTX or NACK/DTX. "HARQ-ACK for a specific CC" or "HARQ-ACK of a specific CC" represents an ACK/NACK response to a data block (e.g. PDSCH) related to the corresponding CC (e.g. scheduled to the corresponding CC). An ACK/NACK state means a combination of a plurality of HARQ-ACKs. Here, the PDSCH can be replaced by a transport block or a codeword.

PUCCH index: this corresponds to a PUCCH resource. The PUCCH index represents a PUCCH resource index, for example. The PUCCH resource index is mapped to at least one of an orthogonal cover (OC), a cyclic shift (CS) and a PRB. When an ACK/NACK selection scheme is applied, the PUCCH index includes a PUCCH index for PUCCH format 1b.

PUCCH resource linked to a CC: this indicates a PUCCH resource (refer to Equation 1, implicit PUCCH resource) linked to a PDCCH corresponding to a PDSCH on the CC, or a PUCCH resource (explicit PUCCH resource) indicated/allocated by the PDCCH corresponding to the PDSCH on the CC. The PUCCH resource can be indicated/allocated using an ARI (ACK/NACK Resource Indicator) of the PDCCH in an explicit PUCCH resource scheme.

ARI: this is used to indicate a PUCCH resource. For example, the ARI can be used to indicate a resource modification value (e.g. offset) for a specific PUCCH resource (group) (configured by a higher layer). Otherwise, the ARI can be used to indicate a specific PUCCH resource (group) index in a PUCCH resource (group) set (configured by a higher layer). The ARI can be included in a TPC (Transmit Power Control) field of a PDCCH corresponding to a PDSCH on an SCC. PUCCH power control is performed through a TPC field in a PDCCH (i.e. a PDCCH corresponding to a PDSCH on a PCC) that schedules the PCC. The ARI is used with a HARQ-ACK resource indication value.

$IMP_P$ (Implicit PUCCH resource): this indicates an implicit PUCCH resource/index linked to a lowest CCE index $CCE$ of a PDCCH that schedules a PCC (refer to Equation 1). $IMP_{P+a}$ (a being 0 or a positive integer) represents a PUCCH linked to a CCE index $CCE_P$+a.

$IMP_S$: this indicates an implicit PUCCH resource/index linked to a lowest CCE index $CCE_S$ of a PDCCH that schedules an SCC (refer to Equation 1). $IMP_{S+b}$ (b being 0 or a positive integer) represents a PUCCH linked to a CCE index $CCE_S$+b.

$EXP_c$ (Explicit PUCCH resource) (c being 0 or a positive integer): this indicates an explicit PUCCH resource. In case of explicit PUCCH indexes allocated to a UE, all the indexes may be consecutive, indexes corresponding to each resource group may be consecutive, or all the indexes may be independently allocated. Here, c may be irrelevant to a PUCCH index. The explicit PUCCH resource can be indicated using the ARI. When the ARI cannot be used, the explicit PUCCH resource may be a PUCCH resource previously fixed by higher layer signaling.

PCC PDCCH: this indicates a PDCCH that schedules a PCC. That is, the PCC PDCCH represents a PDCCH corresponding to a PDSCH on the PCC. The PCC PDCCH is transmitted only on the PCC on the assumption that cross-carrier scheduling is not permitted for the PCC.

SCC PDCCH: this indicates a PDCCH that schedules an SCC. That is, the SCC PDCCH represents a PDCCH corresponding to a PDSCH on the SCC. The SCC PDCCH can be transmitted on the PCC when cross-carrier scheduling is permitted for the SCC. The SCC PDCCH is transmitted only on the SCC when cross-carrier scheduling is not permitted for the SCC.

CC scheduling PDCCH: this indicates a PDCCH that schedules a PDSCH on a corresponding CC. That is, this represents the PDCCH corresponding to the PDSCH on the CC.

SORTD: this is a TxD scheme for transmitting ACK/NACK information/signal through a plurality of antennas (ports) (e.g. TX #1 and TX #2) without additionally modifying/coding the ACK/NACK information/signal. The antennas (ports) transmit ACK/NACK information/signals corresponding thereto using different PUCCH resources/indexes. Provided that 2 antennas (ports) are used, 2 PUCCH resources/indexes for SORTD are referred to as a "SORTD pair" for convenience. That is, the first PUCCH resource of the SORTD pair is used for Tx #1 transmission and the second PUCCH resource of the SORTD pair is used for Tx #2. When SORTD is applied to ACK/NACK selection, as many PUCCH resources/indexes as twice a maximum number of CWs that can be transmitted through all CCs allocated to a UE are needed.

Cross-CC scheduling: this denotes an operation of scheduling/transmitting all PDCCHs through only one PCC.

Non-cross-CC scheduling: this denotes an operation of scheduling/transmitting a PDCCH that schedules each CC through the CC.

LTE-A, permits cross-carrier scheduling for a DL PCC while allowing only self-carrier scheduling for a DL SCC. In this case, a PDCCH that schedules a PDSCH on the DL PCC can be transmitted only on the DL PCC. On the other hand, a PDCCH that schedules a PDSCH on the DL SCC can be transmitted on the DL PCC (cross-carrier scheduling) or transmitted on the DL SCC (self-carrier scheduling).

A description will be given of an ACK/NACK selection based PUCCH resource allocation method for ACK/NACK TxD transmission according to an embodiment of the present invention. For TxD ACK/NACK transmission, a BS and a UE can allocate/use 2 implicit PUCCH resources #1 and #2 respectively linked to a lowest CCE index $n_{CCE}$ and the following CCE index $n_{CCE}+1$ of PDCCHs that schedule CCs irrespective of a transmission mode (MIMO or non-MIMO) configured for each CC (that is, a maximum number of CWs that can be transmitted through each CC), or allocate/use the implicit PUCCH resource #1 and an explicit PUCCH resource. In other words, when ACK/NACK transmission is performed through TxD, the total number of PUCCH resources for ACK/NACK selection is configured as twice the number of CCs allocated to the UE through higher layer (e.g. RRC) signaling. Preferably, the PUCCH resource #1 is allocated for ACK/NACK selection during non-TxD ACK/NACK transmission, whereas implicit PUCCH resource #2 linked to a PDCCH that schedules a non-MIMO CC or an explicit PUCCH resource may be allocated/used in addition to the PUCCH resource #1 during TxD ACK/NACK transmission. Consequently, 2 PUCCH resources (implicit PUCCH resources #1 and #2 or implicit PUCCH resource #1 and one explicit PUCCH resource) linked to each CC form an SCBC pair for ACK/NACK TxD transmission.

Tables 6, 7 and 8 illustrate ACK/NACK selection methods based on TxD (SCBC) when 2 CCs are allocated. Table 6 shows a case of MIMO CC+MIMO CC, Table 7 shows a case of MIMO CC+non-MIMO CC, and Table 8 shows a case of non-MIMO CC+non-MIMO CC. MIMO-CC and non-MIMO CC are simply referred to as MCC and n-MCC, respectively. Differently from the schemes shown in the following tables, SCBC may be applied to MCC and a scheme of transmitting a symbol S that has not been spatial-coded for antenna port #2 through a separate PUCCH resource (e.g. Spatial Orthogonal Resource Transmit Diversity (SORTD)) may be applied to n-MCC. ACK/NACK state mapping at antenna port #1 may correspond to ACK/NACK state mapping during non-TxD ACK/NACK transmission.

TABLE 6

| A/N state | Antenna port #1 | | | | Antenna port #2 | | | |
|---|---|---|---|---|---|---|---|---|
| | MCC #1 PUCCH#1 | MCC #1 PUCCH#2 | MCC #2 PUCCH#1 | MCC #2 PUCCH#2 | MCC #1 PUCCH#1 | MCC #1 PUCCH#2 | MCC #2 PUCCH#1 | MCC #2 PUCCH#2 |
| State #0 | S0 | 0 | 0 | 0 | 0 | S0* | 0 | 0 |
| State #1 | S1 | 0 | 0 | 0 | 0 | S1* | 0 | 0 |
| State #2 | S2 | 0 | 0 | 0 | 0 | S2* | 0 | 0 |
| State #3 | S3 | 0 | 0 | 0 | 0 | S3* | 0 | 0 |
| State #4 | 0 | S0 | 0 | 0 | −S0* | 0 | 0 | 0 |
| State #5 | 0 | S1 | 0 | 0 | −S1* | 0 | 0 | 0 |
| State #6 | 0 | S2 | 0 | 0 | −S2* | 0 | 0 | 0 |
| State #7 | 0 | S3 | 0 | 0 | −S3* | 0 | 0 | 0 |
| State #8 | 0 | 0 | S0 | 0 | 0 | 0 | 0 | S0* |
| State #9 | 0 | 0 | S1 | 0 | 0 | 0 | 0 | S1* |
| State #10 | 0 | 0 | S2 | 0 | 0 | 0 | 0 | S2* |
| State #11 | 0 | 0 | S3 | 0 | 0 | 0 | 0 | S3* |
| State #12 | 0 | 0 | 0 | S0 | 0 | 0 | −S0* | 0 |
| State #13 | 0 | 0 | 0 | S1 | 0 | 0 | −S1* | 0 |
| State #14 | 0 | 0 | 0 | S2 | 0 | 0 | −S2* | 0 |
| State #15 | 0 | 0 | 0 | S3 | 0 | 0 | −S3* | 0 |

TABLE 7

| A/N state | Antenna port #1 | | | | Antenna port #2 | | | |
|---|---|---|---|---|---|---|---|---|
| | MCC PUCCH#1 | MCC PUCCH#2 | n-MCC PUCCH#1 | n-MCC PUCCH#2 | MCC PUCCH#1 | MCC PUCCH#2 | n-MCC PUCCH#1 | n-MCC PUCCH#2 |
| State #0 | S0 | 0 | 0 | 0 | 0 | S0* | 0 | 0 |
| State #1 | S1 | 0 | 0 | 0 | 0 | S1* | 0 | 0 |
| State #2 | S2 | 0 | 0 | 0 | 0 | S2* | 0 | 0 |
| State #3 | S3 | 0 | 0 | 0 | 0 | S3* | 0 | 0 |
| State #4 | 0 | S0 | 0 | 0 | −S0* | 0 | 0 | 0 |
| State #5 | 0 | S1 | 0 | 0 | −S1* | 0 | 0 | 0 |

TABLE 7-continued

| | Antenna port #1 | | | | Antenna port #2 | | | |
|---|---|---|---|---|---|---|---|---|
| A/N state | MCC PUCCH#1 | MCC PUCCH#2 | n-MCC PUCCH#1 | n-MCC PUCCH#2 | MCC PUCCH#1 | MCC PUCCH#2 | n-MCC PUCCH#1 | n-MCC PUCCH#2 |
| State #6 | 0 | S2 | 0 | 0 | −S2* | 0 | 0 | 0 |
| State #7 | 0 | S3 | 0 | 0 | −S3* | 0 | 0 | 0 |
| State #8 | 0 | 0 | S0 | 0 | 0 | 0 | 0 | S0*(or S0) |
| State #9 | 0 | 0 | S1 | 0 | 0 | 0 | 0 | S1*(or S1) |
| State #10 | 0 | 0 | S2 | 0 | 0 | 0 | 0 | S2*(or S2) |
| State #11 | 0 | 0 | S3 | 0 | 0 | 0 | 0 | S3*(or S3) |

TABLE 8

| | Antenna port #1 | | | | Antenna port #2 | | | |
|---|---|---|---|---|---|---|---|---|
| A/N state | n-MCC #1 PUCCH#1 | n-MCC #1 PUCCH#2 | n-MCC #2 PUCCH#1 | n-MCC #2 PUCCH#2 | n-MCC#1 PUCCH#1 | n-MCC #1 PUCCH #2 | n-MCC#2 PUCCH#1 | n-MCC #2 PUCCH #2 |
| State #0 | S0 | 0 | 0 | 0 | 0 | S0*(or S0) | 0 | 0 |
| State #1 | S1 | 0 | 0 | 0 | 0 | S1*(or S1) | 0 | 0 |
| State #2 | S2 | 0 | 0 | 0 | 0 | S2*(or S2) | 0 | 0 |
| State #3 | S3 | 0 | 0 | 0 | 0 | S3*(or S3) | 0 | 0 |
| State #4 | 0 | 0 | S0 | 0 | 0 | 0 | 0 | S0*(or S0) |
| State #5 | 0 | 0 | S1 | 0 | 0 | 0 | 0 | S1*(or S1) |
| State #6 | 0 | 0 | S2 | 0 | 0 | 0 | 0 | S2*(or S2) |
| State #7 | 0 | 0 | S3 | 0 | 0 | 0 | 0 | S3*(or S3) |

Condition #1 may be suitable for a case in which all PDCCHs are scheduled/transmitted through one DL PCC (i.e. a DL CC linked to a UL CC that carries ACK/NACK). In other words, implicit PUCCH resources linked to all PDCCHs scheduled/transmitted through the corresponding PCC can be allocated without colliding with other resources. A case in which PDCCHs are scheduled/transmitted through an SCC (secondary DL CC) other than the PCC can be considered. In this case, an implicit PUCCH resource linked to a PDCCH on the SCC may collide with an implicit PUCCH resource linked to a PDCCH on the PCC. To solve this problem, an ACK/NACK selection scheme that uses an implicit PUCCH resource linked to a PDCCH that schedules the corresponding CC in case of the PCC and uses an explicit PUCCH resource in case of the SCC can be considered. This condition is referred to as "condition #2" for convenience.

LTE-A considers a method of allocating an explicit PUCCH resource that is a reference PUCCH resource through RRC signaling and determining a final ACK/NACK resource through an ARI (ACK/NACK Resource Indicator) in the PDCCH for efficient sharing/operation of explicit PUCCH resources between UEs. The ARI includes an offset value for the reference PUCCH resource, for example.

In condition #2, 2 explicit PUCCH resources linked to the SCC are preferably allocated such that they have consecutive indexes or at least exist in the same RB. To achieve this, the following three methods can be considered.

[Method 1]
(1) A first PUCCH index is allocated through RRC.
(2) An offset to the first PUCCH index is signaled using an ARI. The offset includes 0 and is set to a positive or negative multiple of 2.
(3) Final two PUCCH indexes are determined by (first PUCCH index+offset) and (first PUCCH index+offset+1).

Figure 11:
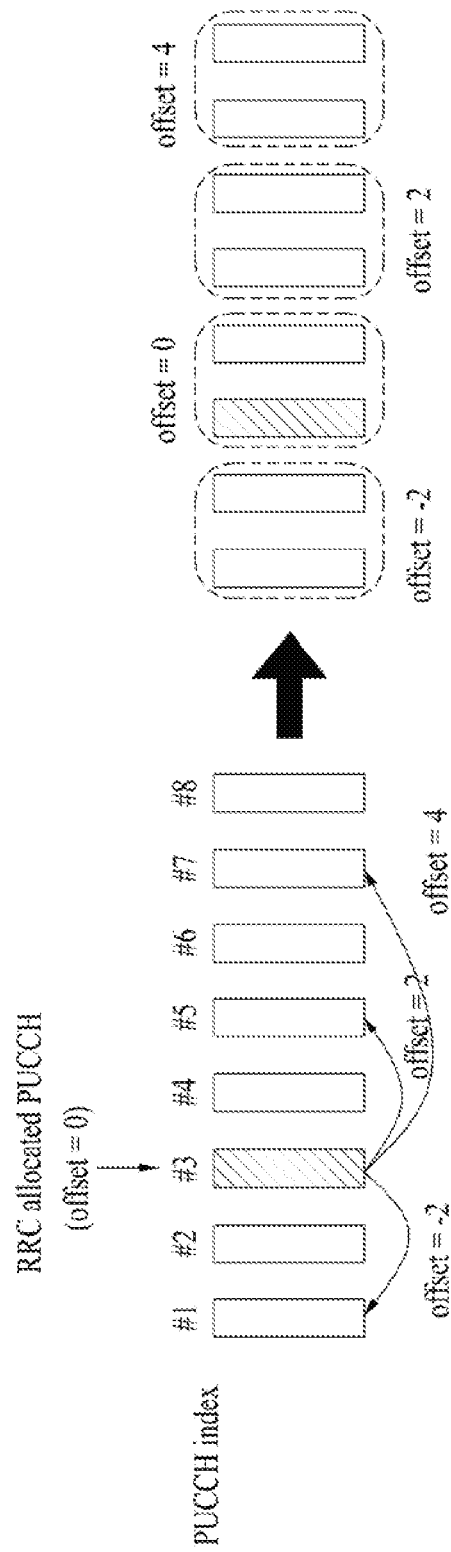
FIGS. 11, 12 and 13 illustrate PUCCH resource allocation according to an embodiment of the present invention.

FIG. 11 illustrates PUCCH resource allocation according to Method 1. Referring to FIG. 11, a reference PUCCH index allocated by RRC is 3. An ARI in a PDCCH indicates a relative offset with respect to the reference PUCCH index. FIG. 11 shows a case in which offsets indicated by an ARI are {−2, 0, 2, 4}. Dotted line parts in the right of FIG. 11 indicate 2 PUCCH indexes finally determined/allocated according to each ARI offset. PUCCH indexes can be indexed such that they wraparound in one RB.

[Method 2]
(1) A first PUCCH index is allocated through RRC.
(2) An offset to the first PUCCH index is signaled using an ARI. The offset includes 0 and is set to a positive or negative number corresponding to a multiple of 1.
(3) Final two PUCCH indexes are determined by (first PUCCH index+offset) and (first PUCCH index+offset+1).

Figure 12:
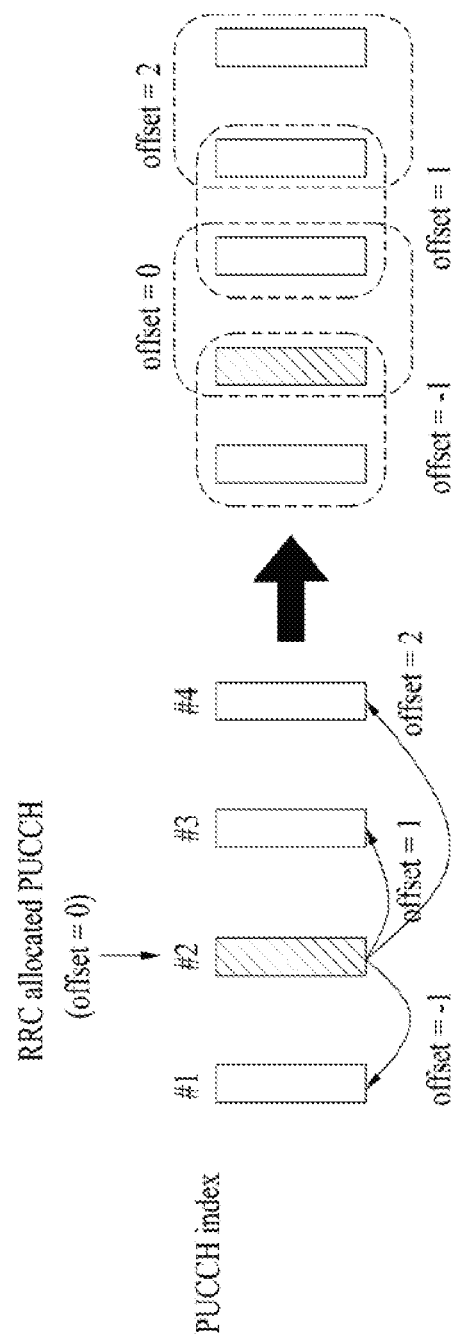

FIG. 12 illustrates PUCCH resource allocation according to Method 2. Referring to FIG. 12, a reference PUCCH index allocated by RRC is 2. An ARI in a PDCCH indicates a relative offset with respect to the reference PUCCH index. FIG. 12 shows a case in which offsets indicated by an ARI are {−1, 1, 2}. Dotted line parts in the right of FIG. 11 indicate 2 PUCCH indexes finally determined/allocated according to each ARI offset. PUCCH indexes can be indexed such that they wrap around in one RB.

[Method 3]
(1) A first PUCCH index is allocated through RRC.
(2) An offset to the first PUCCH index is signaled using an ARI. The offset includes 0 and is set to a positive or negative number corresponding to a multiple of 1.
(3) Final two PUCCH indexes are determined by (first PUCCH index) and (first PUCCH index+offset).

Figure 13:
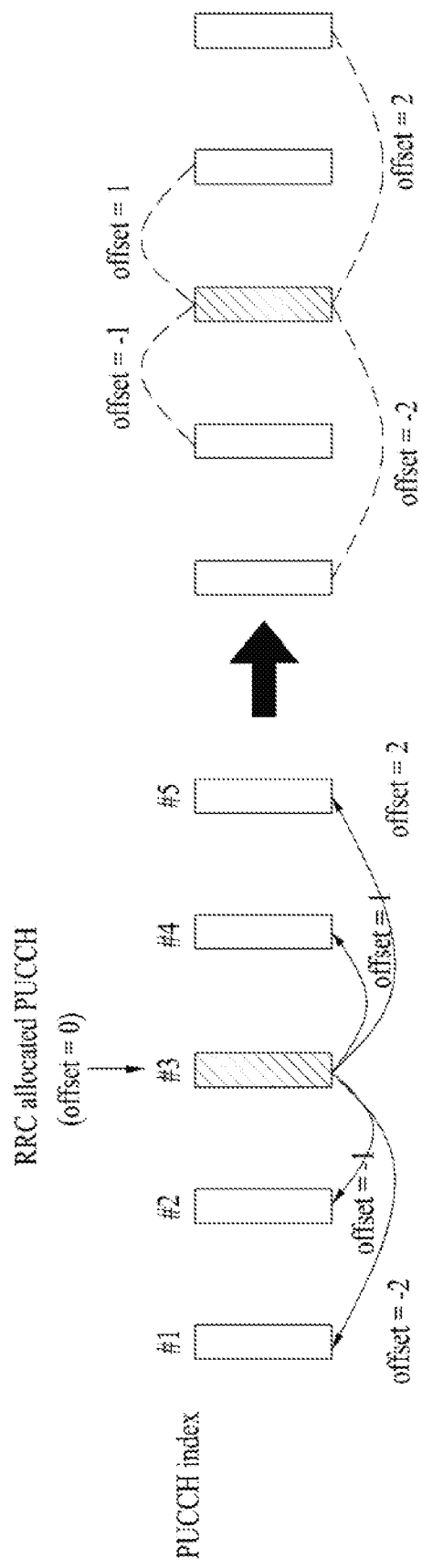

FIG. 13 illustrates PUCCH resource allocation according to Method 3. Referring to FIG. 13, a reference PUCCH index allocated by RRC is 3. An ARI in a PDCCH indicates a relative offset with respect to the reference PUCCH index. FIG. 13 shows a case in which offsets indicated by an ARI are {−2, −1, 1, 2}. In this case, (PUCCH index #3) and (PUCCH index #3+offset) correspond to 2 PUCCH indexes finally determined/allocated according to each ARI offset value. PUCCH indexes can be indexed such that they wraparound in one RB.

Application of one of Methods 1, 2 and 3 may be configured cell-specifically or UE-specifically. A step of offset values signaled by ARIs in Methods 1, 2 and 3 (i.e. whether an offset value is a multiple of 1, a multiple of 2, or a multiple of an integer larger than 2) may be configured through RRC signaling. One of states indicated by ARIs in Methods 1, 2 and 3 may be configured to indicate use of 2 implicit PUCCH resources linked to a PDCCH that schedules an SCC. Alternatively, whether an explicit PUCCH resource is used (option #1) or an implicit PUCCH resource linked to a PDCCH that schedules an SCC is used (option #2) as a PUCCH resource linked to an SCC can be configured cell-specifically or UE-specifically through RRC signaling.

In case of option #1, the final 2 PUCCH indexes can be determined using an ARI according to Method 1, 2 or 3 on the basis of the first PUCCH index allocated by RRC. In case of option #2, an implicit PUCCH index linked to the first CCE of a PDCCH that schedules an SCC can be regarded as a reference PUCCH index. In addition, the final 2 PUCCH indexes can be determined by applying an ARI to the reference PUCCH index according to Method 1, 2 or 3 on the basis of PUCCH indexing. Alternatively, the final 2 CCE indexes can be determined by applying an ARI to a reference CCE index (e.g. the first CCE index of a PDCCH that schedules an SCC) on the basis of CCE indexing according to Method 1, 2 or 3. Then, the 2 CCE indexes are mapped to 2 PUCCH resources, for example, PUCCH indexes.

The above methods have described 2 explicit and/or implicit PUCCH resources. These methods are exemplary and the present invention can also be applied to 3 or more explicit and/or implicit PUCCH resources. For example, Methods 1 and 2 can be normalized as follows if application of an ARI to n (≥2) explicit PUCCH resources is considered.

[Method 4]
(1) A first PUCCH index is allocated through RRC.
(2) An offset to the first PUCCH index is signaled using an ARI. The offset includes 0 and is set to a positive or negative number corresponding to a multiple of m (≥n). Here, m may be predetermined or configured through RRC signaling.
(3) Final n PUCCH indexes are determined by (first PUCCH index+offset), (first PUCCH index+offset+1), . . . (first PUCCH index+offset+n−1).

Alternatively, to apply an ARI to n (≥2) PUCCH resources (which may be explicit PUCCH resources allocated by RRC or implicit PUCCH resources), n PUCCH resources can be divided into a plurality of (G) resource groups each having 2 PUCCH resources. PUCCH resources may be repeated or may overlap over PUCCH groups. Specifically, the same ARI value (e.g. offset) can be applied to G PUCCH indexes (corresponding to G PUCCH resource groups) allocated through RRC. Alternatively, Methods 1, 2 and 3 can be applied on the basis of n PUCCH indexes independently allocated through RRC. A reference PUCCH index may be previously configured (e.g. as a PUCCH having a lowest or highest index) or directly signaled through RRC.

In LTE-A, a DL CC set for a UE can be UE-specifically allocated through RRC signaling. In view of this, DL CC sets (or the numbers of DL CCs) of a corresponding UE, which are respectively recognized by a BS and the UE, may be misaligned during DL CC set reconfiguration through RRC signaling. Accordingly, ACK/NACK feedback may not be normally performed during a CC reconfiguration period. In case of an ACK/NACK selection scheme, for example, ACK/NACK state mapping/configuration recognized by the BS may differ from ACK/NACK state mapping/configuration during a DL CC reconfiguration period.

To solve this problem, when ACK/NACK selection is applied for transmission of a plurality of ACK/NACKs for a plurality of CCs, transmission of ACK/NACK using an implicit PUCCH resource (refer to Equation 1) linked to a PDCCH that schedules a DL PCC (in other words, DL PCell) may be considered if all CCs (i.e. DL SCCs) (in other words, DL SCells) other than the DL PCC correspond to NACK or DTX. That is, an ACK/NACK state in which the DL PCC (or each CW of the DL PCC) corresponds to "A" or "N" and all the DL SCCs (or CWs of the DL SCCs) correspond to "N/D" may be restricted such that the ACK/NACK state uses an implicit PUCCH resource linked to a PDCCH for the DL PCC according to a scheme defined in LTE (which is referred to as "PCC fallback" for convenience), instead of an explicit PUCCH resource in ACK/NACK state mapping design. For PCC fallback, a PUCCH format used for ACK/NACK state transmission and a modulation symbol transmitted in the PUCCH format may be restricted such that they conform to a scheme defined in LTE. For example, an ACK/NACK state may be transmitted using PUCCH format 1b illustrated in FIG. 7 and a modulation table (refer to Table 2) during PCC fallback.

When a PCC transmission mode is configured as the non-MIMO mode (single CW) and 2 ACK/NACK states having "A" or "N" for a PCC and "N/D" for an SCC (or each CW of the SCC) are provided, the ACK/NACK states are mapped to 2 constellation points on a PUCCH resource linked to a PDCCH that schedules the PCC. Preferably, the 2 constellation points for the ACK/NACK states are restricted such that they correspond to 2 constellation points defined for PUCCH format 1a ACK/NACK transmission for transmission of a single CW in a single CC. Otherwise, the 2 constellation points for the ACK/NACK states are restricted such that they correspond to 2 constellation points for "AA" and "NN" from among 4 constellation points defined for PUCCH format 1b ACK/NACK transmission in a single CC. That is, ACK/NACK state mapping positions on constellation are determined on the basis of "A" and "N" of the PCC. Preferably, the ACK/NACK state mapping positions are restricted such that "A" and "N" of the PCC correspond to "A" and "N" for PUCCH format 1a or "AA" and "NN" for PUCCH format 1b.

When the PCC is configured as the MIMO mode (e.g. 2 CWs or 2 TBs) and 4 ACK/NACK states having "A+A", "A+N", "N+A" or "N+N" for the PCC and "N/D" for the SCC (or each CW of the SCC) are provided, the ACK/NACK states are mapped to 4 constellation points on the PUCCH resource linked to the PDCCH that schedules the PCC. The 4 constellation points for the ACK/NACK states preferably correspond to 4 constellation points defined for PUCCH format 1b ACK/NACK transmission for transmission of 2 CWs in a single CC. ACK/NACK state mapping positions on constellation are determined on the basis of "A" and "N" of each CW of the PCC. In the specification, "N" of the PCC includes NACK, DTX or NACK/DTX. Preferably, "A" and "N" of each CW of the PCC correspond to "A" and "N" of each CW for PUCCH format 1b on constellation.

Figure 14:
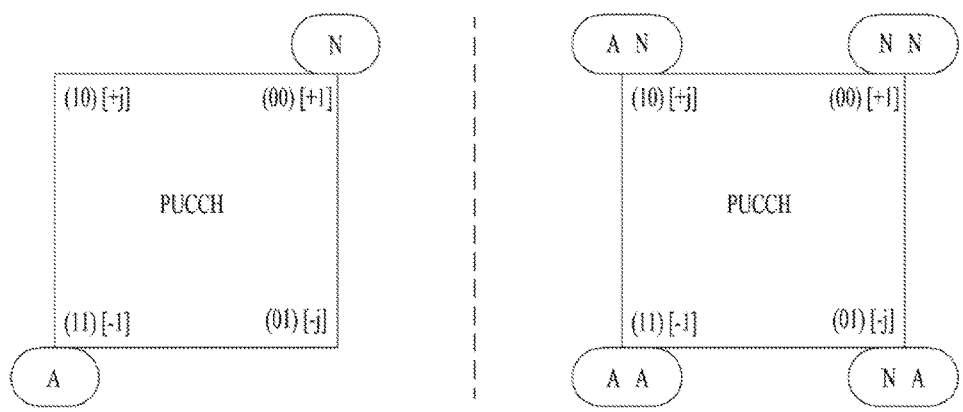
FIG. 14 illustrates an ACK/NACK selection scheme according to LTE.
Figure 15:
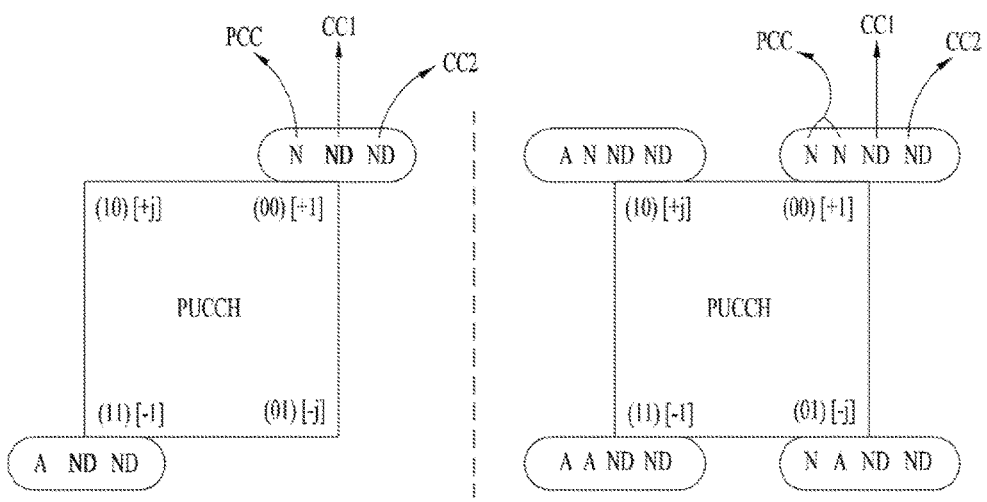
FIG. 15 illustrates an example of transmitting ACK/NACK according to an embodiment of the present invention.

FIG. 14 illustrates a PUCCH format 1a/1b based ACK/NACK selection scheme for transmitting single/two CWs in a single CC according to LTE. FIG. 15 illustrates an ACK/NACK transmission method according to an embodiment of the present invention when 3 CCs (PCC, CC1 and CC2) are aggregated and the PCC is configured as the non-MIMO or MIMO transmission mode. The present embodiment is described on the assumption that all SCCs (i.e. CC1 and CC2) are configured as the non-MIMO mode.

Referring to FIGS. 14 and 15, "explicit ACK/NACK selection" is not applied to an ACK/NACK state having "A" or "N" for the non-MIMO mode PCC and "N/D" for all the SCCs (i.e. PCC fallback). That is, ACK/NACK states (PCC, CC1, CC2)=(A, N/D, N/D), (N, N/D, N/D) are mapped/transmitted to an implicit PUCCH resource linked to a PDCCH that schedules the PCC. In this case, mapping between the ACK/NACK states and constellation points follows the LTE rule shown in FIG. 12 on the basis of ACK/NACK for the PCC.

Furthermore, "explicit ACK/NACK selection" is not applied to an ACK/NACK state having "A+A", "A+N", "N+A" or "N+N" for the MIMO mode PCC and "N/D" for all the SCCs (i.e. PCC fallback). In this case, mapping between the ACK/NACK states and constellation points follows the LTE rule shown in FIG. 14 on the basis of ACK/NACK for the PCC. That is, ACK/NACK states (PCC CW1, PCC CW2, CC1, CC2)=(A, A, N/D, N/D), (A, N, N/D, N/D), (N, A, N/D, N/D), (N, N, N/D, N/D) are mapped/transmitted to the implicit PUCCH resource linked to a PDCCH that schedules the PCC.

Even when the PCC is configured as the MIMO mode, one or more PDSCHs transmitted on the PCC are scheduled through a single PCC PDCCH. Accordingly, one implicit PUCCH resource is occupied for transmission of ACK/NACK relating to the PCC.

Additionally, the present invention proposes PUCCH resource allocation (RA) for SORTD based ACK/NACK selection and an ARI application scheme. Specifically, the present invention proposes an RA method and ARI application scheme in the cross-CC mode and the non-cross-CC mode when 2 CCs (i.e. PCC and SCC) are aggregated. Each CC may be configured as the MIMO transmission mode or the non-MIMO transmission mode. In the following description, a PUCCH resource allocated for TX #1 can be identical to a PUCCH resource allocated for non-TxD based ACK/NACK selection.

Case 1: Case in which Both PCC and SCC are Configured as MIMO Transmission Mode (for Transmission of Up to 4 CWs) and Cross-CC Scheduling is Performed In case 1, it is necessary to allocate a total of 8 PUCCH resources for SORTD based ACK/NACK selection. Since cross-CC scheduling is performed, a PDCCH corresponding to a PDSCH on the SCC is transmitted in the PCC. Accordingly, an implicit PUCCH resource can be allocated as a PUCCH resource linked to the SCC. The following scheme can be considered.

Alt 1-1) Implicit RA Only for TX #1

An implicit PUCCH resource and an explicit PUCCH resource can be respectively allocated to TX #1 and TX #2. 4 PUCCH resource and SORTD pairs allocated to each antenna (port) are listed in the following table.

TABLE 9

| SORTD pair | PCC pair #1 | PCC pair #2 | SCC pair #1 | SCC pair #2 |
|---|---|---|---|---|
| TX #1 | $IMP_P$ | $IMP_{P+1}$ | $IMP_S$ | $IMP_{S+1}$ |
| TX #2 | $EXP_1$ | $EXP_2$ | $EXP_3$ | $EXP_4$ |

In this scheme, an ARI of the SCC PDCCH is preferably used to allocate an additional PUCCH resource for the SCC, preferably, explicit PUCCH resources (i.e. $EXP_3$ and $EXP_4$). $IMP_S$ ($EXP_3$) or $IMP_{S+1}$ ($EXP_4$) is available when the SCC PDCCH is successfully received/detected. Accordingly, the ARI of the SCC PDCCH is applicable to $EXP_3$ and $EXP_4$. In this case, $EXP_1$ and $EXP_2$ may indicate PUCCH resources previously fixed by higher layer (e.g. RRC) signaling.

When PCC fallback is applied, the ARI can be applied to allocate/indicate $EXP_2$ in addition to $EXP_3$ and $EXP_4$. This is because an A/N state having NACK/DTX for at least the SCC (or each CW of the SCC) is mapped only to $IMP_P$ ($EXP_1$) when PCC fallback is applied and thus an A/N state mapped to $IMP_{P+1}$ ($EXP_2$) includes at least one ACK for the SCC (or each CW of the SCC). That is, $IMP_{P+1}$ ($EXP_2$) is used when the SCC PDCCH is successfully received/detected. Accordingly, the ARI of the SCC PDCCH is always applicable to $EXP_2$. $IMP_P$ ($EXP_1$) may be used when the SCC PDCCH is not successfully received/detected, which means that the ARI of the SCC PDCCH cannot always be applied to $EXP_1$. In this case, $EXP_1$ can indicate a PUCCH resource previously fixed through higher layer (e.g. RRC) signaling. That is, the ARI can be used to allocate/indicate explicit PUCCH resources corresponding to $IMP_{P+1}$, $IMP_S$ and/or $IMP_{S+1}$ when an explicit PUCCH resources corresponding to $IMP_S$ and/or $IMP_{S+1}$ or PCC fallback is considered.

When the above description is normalized as "method A", if all A/N states mapped to a PUCCH resource (or a PUCCH resource pair (e.g. SORTD pair) for TxD) include at least one ACK for an SCC (or each CW of the SCC), the ARI of the SCC PDCCH can be used to allocate/indicate the corresponding PUCCH resource (or corresponding PUCCH resource pair). Allocation/indication of the TxD PUCCH resource pair using the ARI of the SCC PDCCH can be performed according to the above-described methods 1 to 4, for example. In this case, one of the PUCCH resources of the TxD PUCCH resource pair can be used as a reference resource used to apply the ARI to the other PUCCH resource.

A resource allocated to TX #1 may be identical to a resource allocated for non-TxD based ACK/NACK selection. In case of non-TxD, the ARI can be applied to $IMP_{S+1}$, and to $IMP_{P+1}$ and/or $IMP_{S+1}$ when PCC fallback is considered.

Alt 1-2) Implicit RA for SORTD Pair 2 implicit PUCCH resources and 2 explicit PUCCHs can be respectively allocated to SORTD pair #1 and SORTD #2 of each CC. 4 PUCCH resources and SORTD pairs allocated to each antenna (port) are listed in the following table. The ARI of the SCC PDCCH can be used to allocate/indicate explicit PUCCH resources (i.e. $EXP_3$ and $EXP_4$ linked/allocated to the SCC, or $EXP_1$, $EXP_2$, $EXP_3$ and $EXP_4$ when PCC fallback is considered). When the ARI of the SCC PDCCH is used only for $EXP_3$ and $EXP_4$, $EXP_1$ and $EXP_2$ may represent PUCCH resources previously fixed by higher layer (e.g. RRC) signaling.

TABLE 10

| SORTD pair | PCC pair #1 | PCC pair #2 | SCC pair #1 | SCC pair #2 |
|---|---|---|---|---|
| TX #1 | $IMP_P$ | $EXP_1$ | $IMP_S$ | $EXP_3$ |
| TX #2 | $IMP_{P+1}$ | $EXP_2$ | $IMP_{S+1}$ | $EXP_4$ |

Resources allocated to TX #1 may be identical to resources allocated for non-TxD based ACK/NACK selection. In case of non-TxD, the ARI can be applied to $EXP_3$, and to $EXP_1$ and/or $EXP_3$ if PCC fallback is considered.

Alt 1-3) Full Implicit RA for all CCs/TXs

Only implicit PUCCH resources can be allocated for all CCs and all TXs. 4 PUCCH resources and SORTD pairs allocated to each antenna (port) are listed in the following table. The ARI of the SCC PDCCH can be used to allocate/indicate implicit PUCCH resources $IMP_{S+2}$ and $IMP_{S+3}$ linked/allocated to the SCC. Considering PCC fallback, the ARI can be used to allocate/indicate ($IMP_{S+2}$, $IMP_{S+3}$) and/or ($IMP_{P+2}$, $IMP_{P+3}$). In the present embodiment, the ARI includes an offset value applied to reference implicit PUCCH resources (e.g. $IMP_P$, $IMP_S$, etc.), for example.

TABLE 11

| SORTD pair | PCC pair #1 | PCC pair #2 | SCC pair #1 | SCC pair #2 |
|---|---|---|---|---|
| TX #1 | $IMP_P$ | $IMP_{P+2}$ | $IMP_S$ | $IMP_{S+2}$ |
| TX #2 | $IMP_{P+1}$ | $IMP_{P+3}$ | $IMP_{S+1}$ | $IMP_{S+3}$ |

Alt 1-4) RA Considering Single CW Fallback

Provided that an A/N state mapping table in consideration of transmission of 2 CWs of the MIMO mode CC is made, when a single CW is transmitted in a MIMO mode CC, only part (preferably, half) of the A/N state mapping table may be used. Specifically, 2 A/N states having ACK or NACK for transmission of a single CW in the MIMO mode CC can be mapped to two (referred to as "1 CW state") from among 4 A/N states (i.e. AA, AN, NA and NN) for transmission of 2 CWs in the MIMO mode CC. Considering ACK/NACK constellation of PUCCH format 1a/1b for single CW transmission in LTE, A and N for a single CW of the MIMO mode CC can be respectively mapped to AA and NN for 2 CWs of the MIMO mode CC. In case of single CW transmission, when the corresponding CW is regarded as the first CW in case of transmission of 2 CWs and the second CW is processed as NACK (or DTX), A and N for the single CW of the MIMO mode CC can be respectively mapped to AN and NN for 2 CWs of the MIMO mode CC.

When 2 CWs are transmitted through the MIMO mode CC, a PDCCH (i.e. DCI format) that schedules the MIMO mode CC may have a relatively large payload. Accordingly, a MIMO scheduling PDCCH can be configured of two or more CCEs. In view of this, 2 implicit PUCCH resources (i.e. IMP #1 and IMP #2) respectively linked to a lowest CCE index $n_{PDCCH}$ of the PDCCH that schedules the MIMO mode CC and the following index $n_{PDCCH}+1$ can be used when 2 CWs are transmitted through the MIMO mode CC. When a single CW is transmitted through the MIMO mode CC, only a single implicit PUCCH resource (i.e. $IMP_P$ or $IMP_S$) linked to the lowest CCE index $n_{PDCCH}$ of the PDCCH that schedules the MIMO mode CC can be used.

To variably allocate PUCCH resources in consideration of whether a single CW is transmitted, 1 CW state of the MIMO mode CC should not be mapped/transmitted to/on $IMP_{X+a}$ (X being P or S, a being an integer greater than 1) linked to the PDCCH that schedules the MIMO mode CC. This condition is referred to as "condition #3" for convenience. Condition #3 is configured because $IMP_{X+a}$ may not be available because a PDCCH for single CW transmission can be configured of only one CCE.

When condition #3 is not satisfied (that is, 1 CW state is mapped to the second PUCCH resource pair linked to the corresponding CC), $IMP_{X+a}$ can be replaced by an explicit PUCCH resource for securing PUCCH resources. Condition #3 may be satisfied according to A/N state mapping for ACK/NACK selection. That is, 2 implicit PUCCH resources can be allocated to a CC that satisfies condition #3, whereas one implicit PUCCH resource and one explicit PUCCH resource can be allocated to a CC that does not satisfy condition #3.

Specifically, Alt 1-1 is applicable when both a PCC and an SCC meet condition #3, whereas Alt 1-2 is applicable when both the PCC and SCC do not satisfy condition #3.

When only the PCC satisfies condition #3, the following two resource allocation schemes can be considered. Resource allocation schemes according to Tables 12 and 13 are respectively referred to as RA 1-1 and RA 1-2 for convenience. Referring to Tables 12 and 13, 2 implicit PUCCH resources are allocated for the PCC and one implicit PUCCH resource and one explicit PUCCH resource are allocated for the SCC in case of TX #1. PUCCH resources for TX #2 can be applied using the various methods described above.

TABLE 12

| SORTD pair | PCC pair #1 | PCC pair #2 | SCC pair #1 | SCC pair #2 |
|---|---|---|---|---|
| TX #1 | $IMP_P$ | $IMP_{P+1}$ | $IMP_S$ | $EXP_3$ |
| TX #2 | $EXP_1$ | $EXP_2$ | $IMP_{S+1}$ | $EXP_4$ |

TABLE 13

| SORTD pair | PCC pair #1 | PCC pair #2 | SCC pair #1 | SCC pair #2 |
|---|---|---|---|---|
| TX #1 | $IMP_P$ | $IMP_{P+1}$ | $IMP_S$ | $EXP_4$ |
| TX #2 | $EXP_1$ | $EXP_2$ | $EXP_3$ | $EXP_5$ |

In case of RA 1-1, the ARI of the SCC PDCCH can be applied to explicit PUCCH resources (e.g. $EXP_3$ and $EXP_4$ linked/allocated to the SCC, or $EXP_2$, $EXP_3$ and $EXP_4$ when PCC fallback is considered) that satisfy method A (refer to Alt 1-1). Resources allocated to TX #1 may be identical to resources allocated for non-TxD based ACK/NACK selection. In case of non-TxD, the ARI can be applied to $EXP_3$, or to $IMP_{P+1}$ and/or $EXP_3$ when PCC fallback is considered.

In case of RA 1-2, the ARI of the SCC PDCCH can be applied to explicit PUCCH resources (e.g. $EXP_3$, $EXP_4$ and $EXP_5$ linked/allocated to the SCC, or $EXP_2$, $EXP_3$, $EXP_4$ and $EXP_5$ when PCC fallback is considered) that satisfy method A. Resources allocated to TX #1 may be identical to resources allocated for non-TxD based ACK/NACK selection. In case of non-TxD, the ARI can be applied to $EXP_4$, or to $IMP_{P+1}$ and/or $EXP_4$ when PCC fallback is considered.

When only the SCC satisfies condition #3, the following 2 resource allocation schemes can be considered. Resource allocation schemes according to Tables 14 and 15 are respectively referred to as RA 2-1 and RA 2-2 for convenience. Referring to Tables 12 and 13, 2 implicit PUCCH resources are allocated for the SCC and one implicit PUCCH resource and one explicit PUCCH resource are allocated for the PCC in case of TX #1. PUCCH resources for TX #2 can be applied using the various methods described above.

TABLE 14

| SORTD pair | PCC pair #1 | PCC pair #2 | SCC pair #1 | SCC pair #2 |
|---|---|---|---|---|
| TX #1 | $IMP_P$ | $EXP_1$ | $IMP_S$ | $IMP_{S+1}$ |
| TX #2 | $IMP_{P+1}$ | $EXP_2$ | $EXP_3$ | $EXP_4$ |

TABLE 15

| SORTD pair | PCC pair #1 | PCC pair #2 | SCC pair #1 | SCC pair #2 |
|---|---|---|---|---|
| TX #1 | $IMP_P$ | $EXP_2$ | $IMP_S$ | $IMP_{S+1}$ |
| TX #2 | $EXP_1$ | $EXP_3$ | $EXP_4$ | $EXP_5$ |

In case of RA 2-1, the ARI of the SCC PDCCH can be applied to explicit PUCCH resources (e.g. $EXP_3$ and $EXP_4$ linked/allocated to the SCC, or $EXP_1$, $EXP_2$, $EXP_3$ and $EXP_4$ when PCC fallback is considered) that satisfy method A (refer to Alt 1-1). Resources allocated to TX #1 may be identical to resources allocated for non-TxD based ACK/NACK selection. In case of non-TxD, the ARI can be applied to $IMP_{S+1}$, or to $IMP_{S+1}$ and/or $EXP_1$ when PCC fallback is considered.

In case of RA 2-2, the ARI of the SCC PDCCH can be applied to explicit PUCCH resources (e.g. $EXP_4$ and $EXP_5$ linked/allocated to the SCC, or $EXP_2$, $EXP_3$, $EXP_4$ and $EXP_5$ when PCC fallback is considered) that satisfy method A. Resources allocated to TX #1 may be identical to resources allocated for non-TxD based ACK/NACK selection. In case of non-TxD, the ARI can be applied to $IMP_{S+1}$, or to $IMP_{S+1}$ and/or $EXP_2$ when PCC fallback is considered.

In the following description, when condition #3 is satisfied for the MIMO mode CC, it is apparent that a scheme in which resources allocated to the corresponding CC are configured of 2 implicit PUCCH resources (in case of TX #1) can be applied. When condition #3 is not satisfied for the MIMO mode CC, it is apparent that a scheme in which resources allocated to the CC correspond to a combination of an implicit PUCCH resource and an explicit PUCCH resource can be applied.

Case 2: Case in which Both PCC and SCC are Configured as MIMO Transmission Mode (for Transmission of Up to 4 CWs) and Non-Cross-CC Scheduling is Performed In case 2, it is necessary to allocate a total of 8 PUCCH resources for SORTD based ACK/NACK selection. Since non-cross-CC scheduling is performed, a PDCCH corresponding to a PDSCH on the SCC is transmitted in the SCC. Accordingly, an explicit PUCCH resource rather than an implicit PUCCH resource can be preferentially allocated as a PUCCH resource linked to the SCC in order to prevent collision of implicit PUCCH resources between UEs. The following scheme can be considered.

Alt 2-1) Implicit RA Only for PCC TX #1

Implicit PUCCH resources can be allocated to TX #1 of the PCC and explicit PUCCH resources can be allocated to the others. 4 PUCCH resource and SORTD pairs allocated to each antenna (port) are listed in the following table. In this scheme, the ARI of the SCC PDCCH can be applied to allocate/indicate explicit PUCCH resources (e.g. $EXP_3$, $EXP_4$, $EXP_5$ and $EXP_6$ linked/allocated to the SCC, or $EXP_2$, $EXP_3$, $EXP_4$, $EXP_5$ and $EXP_6$ when PCC fallback is considered) that satisfy method A (refer to Alt 1-1).

TABLE 16

| SORTD pair | PCC pair #1 | PCC pair #2 | SCC pair #1 | SCC pair #2 |
|---|---|---|---|---|
| TX #1 | $IMP_P$ | $IMP_{P+1}$ | $EXP_3$ | $EXP_5$ |
| TX #2 | $EXP_1$ | $EXP_2$ | $EXP_4$ | $EXP_6$ |

Resources allocated to TX #1 may be identical to resources allocated for non-TxD based ACK/NACK selection. In case of non-TxD, the ARI can be applied to $EXP_3$ and $EXP_5$, or to $IMP_{P+i}$, $EXP_3$ and/or $EXP_5$ when PCC fallback is considered.

Alt 2-2) Implicit RA for PCC SORTD Pair 2 implicit PUCCH resources can be allocated for PCC SORTD pair #1 and explicit PUCCH resources can be allocated for the others. 4 PUCCH resource and SORTD pairs allocated to each antenna (port) are listed in the following table. In this case, the ARI of the SCC PDCCH can be applied to explicit PUCCH resources (particularly, $EXP_3$, $EXP_4$, $EXP_5$ and $EXP_6$ linked/allocated to the SCC, or $EXP_1$, $EXP_2$, $EXP_3$, $EXP_4$, $EXP_5$ and $EXP_6$ when PCC fallback is considered) that satisfy method A.

TABLE 17

| SORTD pair | PCC pair #1 | PCC pair #2 | SCC pair #1 | SCC pair #2 |
|---|---|---|---|---|
| TX #1 | $IMP_P$ | $EXP_1$ | $EXP_3$ | $EXP_5$ |
| TX #2 | $IMP_{P+1}$ | $EXP_2$ | $EXP_4$ | $EXP_6$ |

Resources allocated to TX #1 may be identical to resources allocated for non-TxD based ACK/NACK selection. In case of non-TxD, the ARI can be applied to $EXP_3$ and $EXP_5$, or to $EXP_1$, $EXP_3$ and $EXP_5$ when PCC fallback is considered.

Alt 2-3) Full Implicit RA Only for PCC

Only implicit PUCCH resources can be allocated for the PCC and only explicit PUCCH resources can be allocated for the SCC. 4 PUCCH resource and SORTD pairs allocated to each antenna (port) are listed in the following table. The ARI of the SCC PDCCH can be applied to PUCCH resources (e.g., $EXP_1$, $EXP_2$, $EXP_3$ and $EXP_4$ linked/allocated to the SCC, or ($IMP_{P+2}$, $IMP_{P+3}$) and/or ($EXP_1$, $EXP_2$, $EXP_3$, $EXP_4$) when PCC fallback is considered) that satisfy method A.

TABLE 18

| SORTD pair | PCC pair #1 | PCC pair #2 | SCC pair #1 | SCC pair #2 |
|---|---|---|---|---|
| TX #1 | $IMP_P$ | $IMP_{P+2}$ | $EXP_1$ | $EXP_3$ |
| TX #2 | $IMP_{P+1}$ | $IMP_{P+3}$ | $EXP_2$ | $EXP_4$ |

Case 3: Case in which PCC and SCC are Respectively Configured as MIMO Mode and Non-MIMO Mode (for Transmission of Up to 3 CWs) and Cross-CC Scheduling is Performed In case 3, it is necessary to allocate a total of 6 PUCCH resources for SORTD based ACK/NACK selection. Since cross-CC scheduling is performed, a PDCCH corresponding to a PDSCH on the SCC is transmitted in the PCC. Accordingly, an implicit PUCCH resource can be allocated as a PUCCH resource linked to the SCC. The following scheme can be considered.

Alt 3-1) Implicit RA Only for PCC TX #1 and SCC SORTD Pair

Implicit PUCCH resources can be allocated to PCC TX #1 and SCC SORTD pair and explicit PUCCH resources can be allocated to PCC TX #2. 3 PUCCH resource and SORTD pairs allocated to each antenna (port) are listed in the following table. The ARI of the SCC PDCCH is preferably applied to an implicit PUCCH having a larger value of b from among resources (satisfying method A (refer to Alt 1-1)) linked/allocated to the SCC, $IMP_{S+b}$ (b=0, 1), that is, $IMP_{S+1}$. Considering PCC fallback, the ARI can be applied to $IMP_{S+1}$ and/or $EXP_2$.

TABLE 19

| SORTD pair | PCC pair #1 | PCC pair #2 | SCC pair #1 |
|---|---|---|---|
| TX #1 | $IMP_P$ | $IMP_{P+1}$ | $IMP_S$ |
| TX #2 | $EXP_1$ | $EXP_2$ | $IMP_{S+1}$ |

Resources allocated to TX #1 may be identical to resources allocated for non-TxD based ACK/NACK selection. In case of non-TxD, the ARI can be applied to $IMP_S$, or to $IMP_{P+1}$ and/or $IMP_S$ when PCC fallback is considered.

Alt 3-2) Implicit RA for SORTD Pair

An implicit PUCCH resource can be allocated to SORTD pair #1 of each CC and an explicit PUCCH resource can be allocated to SORTD pair #2 of each CC. 3 PUCCH resource and SORTD pairs allocated to each antenna (port) are listed in the following table. The ARI of the SCC PDCCH is preferably applied to an implicit PUCCH having a larger value of b from among resources (satisfying method A) linked/allocated to the SCC, $IMP_{S+b}$ (b=0, 1), that is, $IMP_{S+1}$. Considering PCC fallback, the ARI can be applied to $IMP_{S+1}$ and/or ($EXP_1$, $EXP_2$).

TABLE 20

| SORTD pair | PCC pair #1 | PCC pair #2 | SCC pair #1 |
|---|---|---|---|
| TX #1 | $IMP_P$ | $EXP_1$ | $IMP_S$ |
| TX #2 | $IMP_{P+1}$ | $EXP_2$ | $IMP_{S+1}$ |

Resources allocated to TX #1 may be identical to resources allocated for non-TxD based ACK/NACK selection. In case of non-TxD, the ARI can be applied to $IMP_S$, or to $EXP_1$ and/or $IMP_S$ when PCC fallback is considered.

Alt 3-3) Full Implicit RA for all CCs/TXs

Only implicit PUCCH resources can be allocated to all CCs and all TXs. 3 PUCCH resource and SORTD pairs allocated to each antenna (port) are listed in the following table. The ARI of the SCC PDCCH is preferably applied to an implicit PUCCH having a larger value of b from among resources (satisfying method A) linked/allocated to the SCC, $IMP_{S+b}$ (b=0, 1), that is, $IMP_{S+1}$. Considering PCC fallback, the ARI can be applied to $IMP_{S+1}$ and/or ($IMP_{P+2}$, $IMP_{P+3}$).

TABLE 21

| SORTD pair | PCC pair #1 | PCC pair #2 | SCC pair #1 |
|---|---|---|---|
| TX #1 | $IMP_P$ | $IMP_{P+2}$ | $IMP_S$ |
| TX #2 | $IMP_{P+1}$ | $IMP_{P+3}$ | $IMP_{S+1}$ |

Case 4: Case in which PCC and SCC are Respectively Configured as MIMO Mode and Non-MIMO Mode (for Transmission of Up to 3 CWs) and Non-Cross-CC Scheduling is Performed In case 4, it is necessary to allocate a total of 6 PUCCH resources for SORTD based ACK/NACK selection. Since non-cross-CC scheduling is performed, a PDCCH corresponding to a PDSCH on the SCC is transmitted in the SCC. Accordingly, an explicit PUCCH resource rather than an implicit PUCCH resource can be preferentially allocated as a PUCCH resource linked to the SCC in order to prevent collision of implicit PUCCH resources between UEs. The following scheme can be considered.

Alt 4-1) Implicit RA Only for PCC TX #1

Implicit PUCCH resources can be allocated to PCC TX #1 and explicit PUCCH resources can be allocated to the others. 3 PUCCH resource and SORTD pairs allocated to each antenna (port) are listed in the following table. The ARI of the SCC PDCCH can be applied to explicit PUCCH resources (e.g. $EXP_3$ and $EXP_4$ linked/allocated to the SCC, or $EXP_2$, $EXP_3$ and $EXP_4$ when PCC fallback is considered) that satisfy method A (refer to Alt 1-1)).

TABLE 22

| SORTD pair | PCC pair #1 | PCC pair #2 | SCC pair #1 |
|---|---|---|---|
| TX #1 | $IMP_P$ | $IMP_{P+1}$ | $EXP_3$ |
| TX #2 | $EXP_1$ | $EXP_2$ | $EXP_4$ |

Resources allocated to TX #1 may be identical to resources allocated for non-TxD based ACK/NACK selection. In case of non-TxD, the ARI can be applied to $EXP_3$, or to $IMP_{P+1}$ and/or $EXP_3$ when PCC fallback is considered.

Alt 4-2) Implicit RA for PCC SORTD Pair

Implicit PUCCH resources can be allocated to PCC SORTD pair #1 and explicit PUCCH resources can be allocated to the others. 3 PUCCH resource and SORTD pairs allocated to each antenna (port) are listed in the following table. The ARI of the SCC PDCCH can be applied to explicit PUCCH resources (e.g. $EXP_3$ and $EXP_4$ linked/allocated to the SCC, or $EXP_1$, $EXP_2$, $EXP_3$ and $EXP_4$ when PCC fallback is considered) that satisfy method A.

TABLE 23

| SORTD pair | PCC pair #1 | PCC pair #2 | SCC pair #1 |
|---|---|---|---|
| TX #1 | $IMP_P$ | $EXP_1$ | $EXP_3$ |
| TX #2 | $IMP_{P+1}$ | $EXP_2$ | $EXP_4$ |

Resources allocated to TX #1 may be identical to resources allocated for non-TxD based ACK/NACK selection. In case of non-TxD, the ARI can be applied to $EXP_3$, or to $EXP_1$ and $EXP_3$.

Alt 4-3) Full Implicit RA Only for PCC

Implicit PUCCH resources can be allocated to the PCC and explicit PUCCH resources can be allocated to the SCC. 3 PUCCH resource and SORTD pairs allocated to each antenna (port) are listed in the following table. The ARI of the SCC PDCCH can be applied to explicit PUCCH resources (e.g. $EXP_1$ and $EXP_2$ linked/allocated to the SCC, or ($IMP_{P+2}$, $IMP_{P+3}$) and/or ($EXP_1$, $EXP_2$) when PCC fallback is considered) that satisfy method A.

TABLE 24

| SORTD pair | PCC pair #1 | PCC pair #2 | SCC pair #1 |
|---|---|---|---|
| TX #1 | $IMP_P$ | $IMP_{P+2}$ | $EXP_1$ |
| TX #2 | $IMP_{P+1}$ | $IMP_{P+3}$ | $EXP_2$ |

Case 5: Case in which PCC and SCC are Respectively Configured as Non-MIMO Mode and MIMO Mode (for Transmission of Up to 3 CWs) and Cross-CC Scheduling is Performed In case 5, it is necessary to allocate a total of 6 PUCCH resources for SORTD based ACK/NACK selection. Since cross-CC scheduling is performed, a PDCCH corresponding to a PDSCH on the SCC is transmitted in the PCC. Accordingly, an implicit PUCCH resource can be allocated as a PUCCH resource linked to the SCC. The following scheme can be considered.

Alt 5-1) Implicit RA for PCC SORTD Pair and TX #1

Implicit PUCCH resources can be allocated to PCC SORTD pair and SCC TX #1 and explicit PUCCH resources can be allocated to SCC TX #2. 3 PUCCH resource and SORTD pairs allocated to each antenna (port) are listed in the following table. The ARI of the SCC PDCCH can be applied to explicit PUCCHs ($EXP_1$, $EXP_2$) that satisfy method A (refer to Alt 1-1).

TABLE 25

| SORTD pair | PCC pair #1 | SCC pair #1 | SCC pair #2 |
|---|---|---|---|
| TX #1 | $IMP_P$ | $IMP_S$ | $IMP_{S+1}$ |
| TX #2 | $IMP_{P+1}$ | $EXP_1$ | $EXP_2$ |

Resources allocated to TX #1 may be identical to resources allocated for non-TxD based ACK/NACK selection. In case of non-TxD, the ARI can be applied to $IMP_S$ and/or $IMP_{S+1}$.

Alt 5-2) Implicit RA for SORTD Pair

An implicit PUCCH resource can be allocated to SORTD pair #1 of each CC and an explicit PUCCH resource can be allocated to SORTD pair #2 of each CC. 3 PUCCH resource and SORTD pairs allocated to each antenna (port) are listed in the following table. The ARI of the SCC PDCCH can be applied to explicit PUCCH resources ($EXP_1$, $EXP_2$) that satisfy method A.

TABLE 26

| SORTD pair | PCC pair #1 | SCC pair #1 | SCC pair #2 |
|---|---|---|---|
| TX #1 | $IMP_P$ | $IMP_S$ | $EXP_1$ |
| TX #2 | $IMP_{P+1}$ | $IMP_{S+1}$ | $EXP_2$ |

Resources allocated to TX #1 may be identical to resources allocated for non-TxD based ACK/NACK selection. In case of non-TxD, the ARI can be applied to $EXP_1$ and/or $IMP_S$.

Alt 5-3) Full Implicit RA for all CCs/TXs

Only implicit PUCCH resources can be allocated to all CCs and all TXs. 3 PUCCH resource and SORTD pairs allocated to each antenna (port) are listed in the following table. The ARI of the SCC PDCCH is preferably applied to implicit PUCCH resources having a larger value of b from among resources (satisfying method A) linked/allocated to the SCC, $IMP_{S+b}$ (b=0, 1, 2, 3), that is, $IMP_{S+2}$ and $IMP_{S+3}$.

TABLE 27

| SORTD pair | PCC pair #1 | SCC pair #1 | SCC pair #2 |
|---|---|---|---|
| TX #1 | $IMP_P$ | $IMP_S$ | $IMP_{S+2}$ |
| TX #2 | $IMP_{P+1}$ | $IMP_{S+1}$ | $IMP_{S+3}$ |

Case 6: Case in which PCC and SCC are Respectively Configured as Non-MIMO Mode and MIMO Mode (for Transmission of Up to 3 CWs) and Non-Cross-CC Scheduling is Performed In case 6, it is necessary to allocate a total of 6 PUCCH resources for SORTD based ACK/NACK selection. In this case, implicit PUCCH resources can be allocated to PCC SORTD pairs and explicit PUCCH resources can be allocated to the others. 3 PUCCH resource and SORTD pairs allocated to each antenna (port) are listed in the following table. The ARI of the SCC PDCCH can be applied to explicit PUCCH resources (e.g. $EXP_1$, $EXP_2$, $EXP_3$ and $EXP_4$ that satisfy method A (refer to Alt 1-1)).

TABLE 28

| SORTD pair | PCC pair #1 | SCC pair #1 | SCC pair #2 |
|---|---|---|---|
| TX #1 | $IMP_P$ | $EXP_1$ | $EXP_3$ |
| TX #2 | $IMP_{P+1}$ | $EXP_2$ | $EXP_4$ |

Resources allocated to TX #1 may be identical to resources allocated for non-TxD based ACK/NACK selection. In case of non-TxD, the ARI can be applied to $EXP_1$ and $EXP_3$.

Case 7: Case in which Both PCC and SCC are Configured as Non-MIMO Mode (for Transmission of Up to 2 CWs) and Cross-CC Scheduling is Performed In case 7, it is necessary to allocate a total of 4 PUCCH resources for SORTD based ACK/NACK selection. In this case, only implicit PUCCH resources can be allocated to all CCs and all TXs. 2 PUCCH resource and SORTD pairs allocated to each antenna (port) are listed in the following table. The ARI of the SCC PDCCH is preferably applied to an implicit PUCCH resource having a larger value of b from among resources (satisfying method A) linked/allocated to the SCC, $IMP_{S+b}$ (b=0, 1), that is, $IMP_{S+1}$.

TABLE 29

| SORTD pair | PCC pair #1 | SCC pair #1 |
|---|---|---|
| TX #1 | $IMP_P$ | $IMP_S$ |
| TX #2 | $IMP_{P+1}$ | $IMP_{S+1}$ |

Resources allocated to TX #1 may be identical to resources allocated for non-TxD based ACK/NACK selection. In case of non-TxD, the ARI can be applied to $IMP_S$.

Case 8: Case in which Both PCC and SCC are Configured as Non-MIMO Mode (for Transmission of Up to 2 CWs) and Non-Cross-CC Scheduling is Performed In case 8, it is necessary to allocate a total of 4 PUCCH resources for SORTD based ACK/NACK selection. In this case, implicit PUCCH resources can be allocated to PCC SORTD pairs and explicit PUCCH resources can be applied to SCC SORTD pairs. 2 PUCCH resource and SORTD pairs allocated to each antenna (port) are listed in the following table. The ARI of the SCC PDCCH is preferably applied to explicit PUCCH resources (e.g. $EXP_1$ and $EXP_2$) that satisfy method A (refer to Alt 1-1).

TABLE 30

| SORTD pair | PCC pair #1 | SCC pair #1 |
|---|---|---|
| TX #1 | $IMP_P$ | $EXP_1$ |
| TX #2 | $IMP_{P+1}$ | $EXP_2$ |

Resources allocated to TX #1 may be identical to resources allocated for non-TxD based ACK/NACK selection. In case of non-TxD, the ARI can be applied to $EXP_1$.

The above-described methods 1, 2, 3 and 4 can be used for application of the ARI proposed in cases 1 to 8. Specifically, the ARI can indicate 1) offset value for a PUCCH resource to which the ARI is applied, or indicate 2) offset value or whether an implicit PUCCH resource is used or not (when an explicit PUCCH resource is reserved). In addition, the ARI can indicate 3) resource (group) index in a predefined PUCCH resource (group) set to which the ARI is applied, or indicate 4) resource (group) index in a set or whether an implicit PUCCH resource is used or not. Here, when the ARI is applied to an implicit PUCCH, the ARI can be used as an offset value for a PUCCH index allocated through the above-mentioned schemes or an offset value for a CCE index linked to an allocated PUCCH index. When a single ARI is applied to both implicit and explicit PUCCH resources, the ARI can be used to indicate 5) offset values for both the implicit and explicit PUCCH resources (here, offset step values may be configured differently for the implicit PUCCH resource and the explicit PUCCH resource), or indicate 6) offset value for the implicit PUCCH resource and an index in a set for the explicit PUCCH resource.

Cases 1 to 8 propose RA and ARI schemes suitable for each of the cross-CC mode and non-cross-CC mode by distinguishing the cross-CC mode and non-cross-CC mode from each other. However, the RA and ARI schemes proposed in cases 1 to 8 can be applied according to scheduling capability of the BS and PUCCH resource load without discriminating between the cross-CC mode and the non-cross-CC mode. In other words, cases 1, 3, 5 and 7 may be applied to the non-cross-CC mode and cases 2, 4, 6 and 8 may be applied to the cross-CC mode.

It is apparent that all schemes proposed in cases 1 to 8 are applicable when a plurality of SCCs is present. Specifically, a scheme of performing RA for a PCC and SCCs according to a combination of two of the schemes of cases 1 to 8 can be considered.

<S1> Case of MIMO Mode PCC and Cross-CC Scheduling

Rule 1-1) SCC RA of Alt 1-1 (i.e. implicit RA only for TX #1) can be applied to a MIMO mode SCC and SCC RA of Alt 3-1 (i.e. implicit RA for SORTD pair) can be applied to a non-MIMO mode SCC. In case of the PCC, PCC RA of Alt 1-1/3-1 (i.e. implicit RA only for TX #1) can be applied. Resources allocated to TX #1 may be identical to resources allocated for non-TxD based ACK/NACK selection.

Rule 1-2) SCC RA of Alt 1-2 can be applied to the MIMO mode SCC and SCC RA of Alt 3-2 can be applied to the non-MIMO mode SCC. In case of the PCC, PCC RA of Alt 1-2/3-2 can be applied. Resources allocated to TX #1 may be identical to resources allocated for non-TxD based ACK/NACK selection.

Rule 1-3) SCC RA of Alt 1-3 can be applied to the MIMO mode SCC and SCC RA of Alt 3-3 can be applied to the non-MIMO mode SCC. In case of the PCC, PCC RA of Alt 1-3/3-3 can be applied. Resources allocated to TX #1 may be identical to resources allocated for non-TxD based ACK/NACK selection.

<S2> Case of MIMO Mode PCC and Non-Cross-CC Scheduling

Rule 2-1) SCC RA of Alt 2-1 can be applied to the MIMO mode SCC and SCC RA of Alt 4-1 can be applied to the non-MIMO mode SCC. In case of the PCC, PCC RA of Alt 2-1/4-1 can be applied. Resources allocated to TX #1 may be identical to resources allocated for non-TxD based ACK/NACK selection.

Rule 2-2) SCC RA of Alt 2-2 can be applied to the MIMO mode SCC and SCC RA of Alt 4-2 can be applied to the non-MIMO mode SCC. In case of the PCC, PCC RA of Alt 2-2/4-2 can be applied. Resources allocated to TX #1 may be identical to resources allocated for non-TxD based ACK/NACK selection.

Rule 2-3) SCC RA of Alt 2-3 can be applied to the MIMO mode SCC and SCC RA of Alt 4-3 can be applied to the non-MIMO mode SCC. In case of the PCC, PCC RA of Alt 2-3/4-3 can be applied. Resources allocated to TX #1 may be identical to resources allocated for non-TxD based ACK/NACK selection.

<S3> Case of Non-MIMO Mode PCC and Cross-CC Scheduling

Rule 3-1) SCC RA of Alt 5-1 can be applied to the MIMO mode SCC and SCC RA of case 7 can be applied to the non-MIMO mode SCC. In case of the PCC, PCC RA of Alt 5-1/case 7 can be applied. Resources allocated to TX #1 may be identical to resources allocated for non-TxD based ACK/NACK selection.

Rule 3-2) SCC RA of Alt 5-2 can be applied to the MIMO mode SCC and SCC RA of case 7 can be applied to the non-MIMO mode SCC. In case of the PCC, PCC RA of Alt 5-2/case 7 can be applied. Resources allocated to TX #1 may be identical to resources allocated for non-TxD based ACK/NACK selection.

Rule 3-3) SCC RA of Alt 5-3 can be applied to the MIMO mode SCC and SCC RA of case 7 can be applied to the non-MIMO mode SCC. In case of the PCC, PCC RA of Alt 5-3/case 7 can be applied. Resources allocated to TX #1 may be identical to resources allocated for non-TxD based ACK/NACK selection.

<S4> Case of Non-MIMO Mode PCC and Non-Cross-CC Scheduling

Rule 4) SCC RA of case 6 can be applied to the MIMO mode SCC and SCC RA of case 8 can be applied to the non-MIMO mode SCC. In case of the PCC, PCC RA of case 6/case 8 can be applied. Resources allocated to TX #1 may be identical to resources allocated for non-TxD based ACK/NACK selection.

Preferably, rules 1-1, 2-1, 3-1 and 4 may be applied according to a PCC transmission mode and whether cross-CC scheduling is performed in case of non-TxD based ACK/NACK selection, and rules 1-2, 2-2, 3-2 and 4 may be applied according to a PCC transmission mode and whether cross-CC scheduling is performed in case of TxD (e.g. SORTD) based ACK/NACK selection.

In an LTE-A TDD system, a case in which a plurality of CCs is aggregated can be considered. Accordingly, the LTE-A TDD system considers transmission of a plurality of ACK/NACK information/signals for a plurality of PDSCHs transmitted through a plurality of DL subframes (SFs) and a plurality of DL CCs, through a specific UL CC (that is, A/N CC) in UL subframes corresponding to the plurality of DL subframes. In this respect, it is possible to consider a scheme (i.e. full ACK/NACK scheme) of transmitting a plurality of ACKs/NACKs corresponding to a maximum number of CWs that can be transmitted through all DL CCs allocated to a UE, for all DL subframes. Furthermore, it is possible to consider a scheme (i.e. bundled ACK/NACK scheme) of bundling a plurality of ACKs/NACKs corresponding to a maximum number of CWs that can be transmitted through all DL CCs allocated to a UE, in CW and/or CC and/or subframe domain to reduce the number of ACKs/NACKs to be transmitted and transmitting ACKs/NACKs. CW bundling means ACK/NACK bundling applied for each DL CC in each DL subframe. CC bundling means ACK/NACK bundling applied for all or some DL CCs in each DL subframe. Subframe bundling means ACK/NACK bundling applied for all or some DL subframes in each DL CC. ACK/NACK bundling means a logical-AND operation of ACK/NACK results.

A description will be given of a PUCCH RA method for non-TxD transmission based ACK/NACK selection in a CA based TDD system. Specifically, 4-bit ACK/NACK transmission (which requires allocation of up to 4 PUCCH resources) is described. It is assumed that 2 CCs (i.e. a PCC and an SCC) in the non-MIMO mode are aggregated and DL SF:UL SF=2:1 for convenience. Terms used in the following description will now be explained.

PUCCH resource linked to SF: this indicates a PUCCH resource (refer to Equation 1, implicit PUCCH resource) linked to a PDCCH corresponding to a PDSCH on a corresponding SF, or a PUCCH resource (explicit PUCCH resource) indicated by a PDCCH corresponding to a PDSCH on a corresponding CC. This can be indicated using an ARI (ACK/NACK Resource Indicator) of the PDCCH in the explicit PUCCH resource scheme. In case of CC aggregation, a PUCCH resource linked to an SF can be allocated on a CC basis.

PUCCH resource linked to CC: this indicates a PUCCH resource (refer to Equation 1, implicit PUCCH resource) linked to a PDCCH corresponding to a PDSCH on a corresponding CC, or a PUCCH resource (explicit PUCCH resource) indicated by the PDCCH corresponding to the PDSCH on the corresponding CC. This can be indicated using an ARI of the PDCCH in the explicit PUCCH resource scheme. In a TDD system, a PUCCH resource linked to a CC can be allocated on a subframe basis.

$IMP_{Pn}$: this indicates an implicit PUCCH resource/index linked to a lowest CCE index $CCE_{Pn}$ of a PDCCH corresponding to a PDSCH on a PCC transmitted in an n-th SF. $IMP_{Pn+d}$ indicates a PUCCH resource/index linked to $CCE_{Pn+d}$.

$IMP_{Sn}$: this indicates an implicit PUCCH resource/index linked to a lowest CCE index $CCE_{Sn}$ of a PDCCH corresponding to a PDSCH on an SCC transmitted in an n-th SF. $IMP_{Sn+e}$ indicates a PUCCH resource/index linked to $CCE_{Sn+e}$.

The PUCCH RA method for non-TxD transmission based ACK/NACK selection in a CA based TDD system is described in detail.

TDD RA 1) Full Implicit RA

Only implicit PUCCH resources can be allocated all CCs and all SFs.

TABLE 31

|  | PCC | SCC |
| --- | --- | --- |
| SF #1 | $IMP_{P1}$ | $IMP_{S1}$ |
| SF #2 | $IMP_{P2}$ | $IMP_{S2}$ |

When SORTD transmission is supported, the following PUCCH resource allocation scheme can be applied. In Tables 32, 33 and 34, resources in parentheses indicate resources added to configure SORTD pairs. The ARI of the SCC PDCCH is preferably used to allocate an explicit PUCCH resource for the SCC. $IMP_{S1}$ or $IMP_{S2}$ is available when the SCC PDCCH is successfully received/detected. Accordingly, the ARI of the SCC PDCCH can always be used to allocate/indicate explicit PUCCH resources linked to the SCC (Table 33: $EXP_3$ and $EXP_4$ and Table 34: $EXP_1$ and $EXP_2$). In Table 33, explicit PUCCH resources $EXP_1$ and $EXP_2$ linked to the PCC can indicate PUCCH resources previously fixed by higher layer (e.g. RRC) signaling. The ARI can be applied according to methods 1 to 4.

TABLE 32

|  | PCC | SCC |
| --- | --- | --- |
| SF #1 | $IMP_{P1}$ ($IMP_{P1+1}$) | $IMP_{S1}$ ($IMP_{S1+1}$) |
| SF #2 | $IMP_{P2}$ ($IMP_{P2+1}$) | $IMP_{S2}$ ($IMP_{S2+1}$) |

TABLE 33

|  | PCC | SCC |
| --- | --- | --- |
| SF #1 | $IMP_{P1}$ ($EXP_1$) | $IMP_{S1}$ ($EXP_3$) |
| SF #2 | $IMP_{P2}$ ($EXP_2$) | $IMP_{S2}$ ($EXP_4$) |

TABLE 34

|  | PCC | SCC |
| --- | --- | --- |
| SF #1 | $IMP_{P1}$ ($IMP_{P1+1}$) | $IMP_{S1}$ ($EXP_1$) |
| SF #2 | $IMP_{P2}$ ($IMP_{P2+1}$) | $IMP_{S2}$ ($EXP_2$) |

TDD RA 2) Implicit RA Only for SF #1

Only implicit PUCCH resources can be applied to SF #1 as follows.

TABLE 35

|  | PCC | SCC |
| --- | --- | --- |
| SF #1 | $IMP_{P1}$ | $IMP_{S1}$ |
| SF #2 | $EXP_1$ | $EXP_2$ |

When SORTD transmission is supported, the following PUCCH resource allocation scheme can be applied. In Tables 36, 37 and 38, resources in parentheses indicate resources added to configure SORTD pairs.

TABLE 36

|  | PCC | SCC |
| --- | --- | --- |
| SF #1 | $IMP_{P1}$ ($IMP_{P1+1}$) | $IMP_{S1}$ ($IMP_{S1+1}$) |
| SF #2 | $EXP_1$ ($EXP_3$) | $EXP_2$ ($EXP_4$) |

TABLE 37

|  | PCC | SCC |
| --- | --- | --- |
| SF #1 | $IMP_{P1}$ ($EXP_3$) | $IMP_{S1}$ ($EXP_5$) |
| SF #2 | $EXP_1$ ($EXP_4$) | $EXP_2$ ($EXP_6$) |

TABLE 38

|  | PCC | SCC |
| --- | --- | --- |
| SF #1 | $IMP_{P1}$ ($IMP_{P1+1}$) | $IMP_{S1}$ ($EXP_4$) |
| SF #2 | $EXP_1$ ($EXP_3$) | $EXP_2$ ($EXP_5$) |

TDD RA 3) Implicit RA Only for SF #2

Only implicit PUCCH resources can be applied to SF #2 as follows.

TABLE 39

|  | PCC | SCC |
| --- | --- | --- |
| SF #1 | $EXP_1$ | $EXP_2$ |
| SF #2 | $IMP_{P2}$ | $IMP_{S2}$ |

When SORTD transmission is supported, the following PUCCH resource allocation scheme can be applied. In Tables 40, 41 and 42, resources in parentheses indicate resources added to configure SORTD pairs.

TABLE 40

|  | PCC | SCC |
| --- | --- | --- |
| SF #1 | $EXP_1$ ($EXP_3$) | $EXP_2$ ($EXP_4$) |
| SF #2 | $IMP_{P2}$ ($IMP_{P2+1}$) | $IMP_{S2}$ ($IMP_{S2+1}$) |

TABLE 41

|  | PCC | SCC |
| --- | --- | --- |
| SF #1 | $EXP_1$ ($EXP_3$) | $EXP_2$ ($EXP_5$) |
| SF #2 | $IMP_{P2}$ ($EXP_4$) | $IMP_{S2}$ ($EXP_6$) |

TABLE 42

| | PCC | SCC |
|---|---|---|
| SF #1 | $EXP_1$ ($EXP_3$) | $EXP_2$ ($EXP_4$) |
| SF #2 | $IMP_{P2}$ ($IMP_{P2+1}$) | $IMP_{S2}$ ($EXP_5$) |

TDD RA 4) Implicit RA Only for PCC

Only implicit PUCCH resources can be applied to the PCC as follows.

TABLE 43

| | PCC | SCC |
|---|---|---|
| SF #1 | $IMP_{P1}$ | $EXP_1$ |
| SF #2 | $IMP_{P2}$ | $EXP_2$ |

When SORTD transmission is supported, the following PUCCH resource allocation scheme can be applied. In Tables 44 and 45, resources in parentheses indicate resources added to configure SORTD pairs.

TABLE 44

| | PCC | SCC |
|---|---|---|
| SF #1 | $IMP_{P1}$ ($IMP_{P1+1}$) | $EXP_1$ ($EXP_3$) |
| SF #2 | $IMP_{P2}$ ($IMP_{P2+1}$) | $EXP_2$ ($EXP_4$) |

TABLE 45

| | PCC | SCC |
|---|---|---|
| SF #1 | $IMP_{P1}$ ($EXP_3$) | $EXP_1$ ($EXP_5$) |
| SF #2 | $IMP_{P2}$ ($EXP_4$) | $EXP_2$ ($EXP_6$) |

When one or more of the PCC and SCC are configured as the MIMO transmission mode, it is possible to apply CW bundling to the corresponding CCs and then apply the above-described TDD RAs 1 to 4 thereto.

Figure 16:
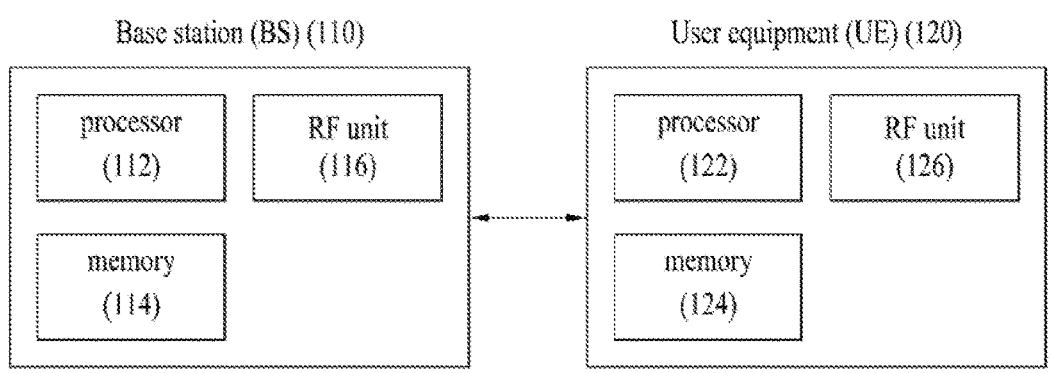
FIG. 16 illustrates a base station (BS) and a UE applicable to an embodiment of the present invention.

FIG. 16 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 16, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method for receiving uplink control information when a plurality of cells including a primary cell and a secondary cell are configured for a user equipment (UE) in a wireless communication system, the method performed by a base station and comprising:

receiving, through multiple antennas, a bit value corresponding to a plurality of Hybrid Automatic Repeat reQuest (HARQ)-ACKs on a Physical Uplink Control Channel (PUCCH) resource pair which is selected from among a plurality of PUCCH resource pairs for a PUCCH format 1b, wherein the plurality of PUCCH resource pairs includes resources shown in the following table,

|  | PUCCH resource pair #1 | PUCCH resource pair #2 | PUCCH resource pair #3 | PUCCH resource pair #4 |
|---|---|---|---|---|
| TX #N | $IMP_P$ | $IMP_{P+1}$ | $EXP_3$ | $EXP_5$ |
| TX #M | $EXP_1$ | $EXP_2$ | $EXP_4$ | $EXP_6$ | wherein TX #N and TX #M respectively denote antenna ports N and M, $IMP_P$ denotes a PUCCH resource linked to a lowest Control Channel Element (CCE) index $n_{CCE,P}$ corresponding to a Physical Downlink Control Channel (PDCCH) related with a Physical Downlink Shared Channel (PDSCH) in the primary cell, $IMP_{P+1}$ represents a PUCCH resource linked to $n_{CCE,P}+1$, and wherein $EXP_1$, $EXP_2$, $EXP_3$, $EXP_4$, $EXP_5$, and $EXP_6$ represent PUCCH resources configured by a higher layer.

2. The method according to claim 1, wherein the primary cell includes a primary component carrier (PCC) and the secondary cell includes a secondary component carrier (SCC).

3. The method according to claim 1, wherein a PDCCH related with a PDSCH in the secondary cell is transmitted through the secondary cell.

4. A base station configured to receive uplink control information when a plurality of cells including a primary cell and a secondary cell are configured for a user equipment (UE) in a wireless communication system, the base station comprising:

an radio frequency (RF) unit; and a processor, wherein the processor is configured to receive, through multiple antennas and the RF unit, a bit value corresponding to a plurality of Hybrid Automatic Repeat reQuest (HARQ)-ACKs on a Physical Uplink Control Channel (PUCCH) resource pair which is selected from among a plurality of PUCCH resource pairs for a PUCCH format 1b, wherein the plurality of PUCCH resource pairs includes resources shown in the following table,

|  | PUCCH resource pair #1 | PUCCH resource pair #2 | PUCCH resource pair #3 | PUCCH resource pair #4 |
|---|---|---|---|---|
| TX #N | $IMP_P$ | $IMP_{P+1}$ | $EXP_3$ | $EXP_5$ |
| TX #M | $EXP_1$ | $EXP_2$ | $EXP_4$ | $EXP_6$ | wherein TX #N and TX #M respectively denote antenna ports N and M, $IMP_P$ denotes a PUCCH resource linked to a lowest Control Channel Element (CCE) index $n_{CCE,P}$ corresponding to a Physical Downlink Control Channel (PDCCH) related with a Physical Downlink Shared Channel (PDSCH) in the primary cell, $IMP_{P+1}$ represents a PUCCH resource linked to $n_{CCE,P}+1$, and wherein $EXP_1$, $EXP_2$, $EXP_3$, $EXP_4$, $EXP_5$, and $EXP_6$ represent PUCCH resources configured by a higher layer.

5. The base station according to claim 4, wherein the primary cell includes a primary component carrier (PCC) and the secondary cell includes a secondary component carrier (SCC).

6. The base station according to claim 4, wherein a PDCCH related with a PDSCH in the secondary cell is transmitted through the secondary cell.

* * * * *